US012562383B2

(12) United States Patent
Hayashi et al.

(10) Patent No.: US 12,562,383 B2
(45) Date of Patent: Feb. 24, 2026

(54) POSITIVE ELECTRODE ACTIVE MATERIAL FOR LITHIUM ION SECONDARY BATTERY AND LITHIUM ION SECONDARY BATTERY

(71) Applicant: SUMITOMO METAL MINING CO., LTD., Tokyo (JP)

(72) Inventors: Tetsutaro Hayashi, Niihama (JP); Willy Shun Kai Bong, Niihama (JP); Shinsuke Suganuma, Niihama (JP); Toshihiro Kato, Tokyo (JP); Jiro Okada, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 830 days.

(21) Appl. No.: 17/761,909

(22) PCT Filed: Sep. 18, 2020

(86) PCT No.: PCT/JP2020/035591
§ 371 (c)(1),
(2) Date: Mar. 18, 2022

(87) PCT Pub. No.: WO2021/054469
PCT Pub. Date: Mar. 25, 2021

(65) Prior Publication Data
US 2022/0376243 A1 Nov. 24, 2022

(30) Foreign Application Priority Data

Sep. 19, 2019 (JP) ................................ 2019-170439
Mar. 27, 2020 (JP) ................................ 2020-058026

(51) Int. Cl.
H01M 4/525 (2010.01)
H01M 4/485 (2010.01)
(Continued)

(52) U.S. Cl.
CPC ........... H01M 4/525 (2013.01); H01M 4/485 (2013.01); H01M 4/505 (2013.01);
(Continued)

(58) Field of Classification Search
CPC ..................................................... H01M 4/525
See application file for complete search history.

(56) References Cited

U.S. PATENT DOCUMENTS

2013/0252093 A1 9/2013 Yokomizo et al.
2015/0364761 A1* 12/2015 Fukui ................... H01M 4/505
429/223
(Continued)

FOREIGN PATENT DOCUMENTS

CN 107039653 A 8/2017
CN 107615531 A 1/2018
(Continued)

OTHER PUBLICATIONS

JP-2008147068-A Translation from Espacenet (Year: 2008).*
(Continued)

*Primary Examiner* — Nathanael T Zemui
(74) *Attorney, Agent, or Firm* — WHDA, LLP

(57) ABSTRACT

The positive electrode active material is capable of reducing positive electrode resistance, exhibiting better output characteristics, and having high mechanical strength when the positive electrode active material is used in a lithium ion secondary battery. Secondary particles have a d50 of 3.0 to 7.0 $\mu m$, a BET specific surface area of 2.0 to 5.0 $m^2/g$, a tap density of 1.0 to 2.0 $g/cm^3$, and an oil absorption amount of 30 to 60 ml/100 g. In each of a plurality of primary particles having a primary particle size of 0.1 to 1.0 $\mu m$, a coefficient of variation of the concentration of an additive element M is 1.5 or less. The volume of a linking section between the primary particles per primary particle, obtained from the
(Continued)

total volume of the linking section and the number of primary particles constituting the secondary particles, is $5 \times 10^5$ to $9 \times 10^7$ nm$^3$.

11 Claims, 4 Drawing Sheets

(51) Int. Cl.

| | | |
|---|---|---|
| *H01M 4/505* | (2010.01) | |
| *H01M 10/0525* | (2010.01) | |
| *H01M 50/46* | (2021.01) | |
| *H01M 4/02* | (2006.01) | |

(52) U.S. Cl.
CPC ....... *H01M 10/0525* (2013.01); *H01M 50/46* (2021.01); *H01M 2004/028* (2013.01)

(56) References Cited

U.S. PATENT DOCUMENTS

| | | | | |
|---|---|---|---|---|
| 2016/0190595 A1* | 6/2016 | Takahata | .............. | H01M 4/485 |
| | | | | 429/188 |
| 2017/0125795 A1 | 5/2017 | Sugiura | | |
| 2017/0324091 A1* | 11/2017 | Hasegawa | ............. | H01M 4/505 |
| 2018/0190978 A1 | 7/2018 | Toma et al. | | |

| | | | | |
|---|---|---|---|---|
| 2018/0254481 A2 | 9/2018 | Kamata et al. | | |
| 2018/0347069 A1 | 12/2018 | Toya et al. | | |
| 2019/0379038 A1* | 12/2019 | Toma | ..................... | C01G 53/04 |

FOREIGN PATENT DOCUMENTS

| | | | | |
|---|---|---|---|---|
| JP | 2008147068 A | * | 6/2008 | |
| JP | 2012-246199 A | | 12/2012 | |
| JP | 2017-016753 A | | 1/2017 | |
| JP | 2017-091664 A | | 5/2017 | |
| JP | 2017-204331 A | | 11/2017 | |
| JP | 2018-104276 A | | 7/2018 | |
| WO | 2012/057290 A1 | | 5/2012 | |
| WO | 2012/131881 A1 | | 10/2012 | |
| WO | 2014/115754 A1 | | 7/2014 | |
| WO | 2014/181891 A1 | | 11/2014 | |
| WO | 2016/103998 A1 | | 6/2016 | |

OTHER PUBLICATIONS

Office Action dated Jan. 4, 2024, issued in counterpart CN Application No. 202080066186.4, with English translation. (10 pages).
International Search Report dated Dec. 28, 2020, issued in counterpart International application No. PCT/JP2020/035591, with English translation. (10 pages).
Extended (Supplementary) European Search Report dated Sep. 19, 2023, issued in counterpart EP application No. 20866609.9. (7 pages).

* cited by examiner

1

POSITIVE ELECTRODE ACTIVE MATERIAL FOR LITHIUM ION SECONDARY BATTERY AND LITHIUM ION SECONDARY BATTERY

TECHNICAL FIELD

The present invention relates to a positive electrode active material for a lithium ion secondary battery formed of a lithium transition metal-containing composite oxide and a lithium ion secondary battery using the positive electrode active material for a lithium ion secondary battery as a positive electrode material.

BACKGROUND ART

In recent years, with spread of a portable electronic device such as a smartphone, a tablet terminal, a digital camera, or a notebook personal computer, there is a strong demand for development of a small and lightweight secondary battery having a high energy density. Furthermore, there is a strong demand for development of a high-capacity and high-output secondary battery as a power source for an electric car such as a hybrid electric car, a plug-in hybrid electric car, or a battery-powered electric car.

As a secondary battery satisfying such a requirement, there is a lithium ion secondary battery. This lithium ion secondary battery includes a negative electrode, a positive electrode, a non-aqueous electrolyte or a solid electrolyte, and the like, and as an active material used as a material for these negative electrode and positive electrode, a material capable of de-inserting and inserting lithium is used. Note that, as the non-aqueous electrolyte, there is a non-aqueous electrolyte solution that is obtained by dissolving a lithium salt as a supporting salt in an organic solvent, and as the solid electrolyte, there is an inorganic or organic solid electrolyte that is non-flammable and has lithium ion conductivity.

Among lithium ion secondary batteries, a lithium ion secondary battery using a lithium transition metal-containing composite oxide having a layered rock salt type or spinel type crystal structure as a positive electrode material has been researched and developed and has been put into practical use as a battery having a high energy density because a voltage at a level of 4 V can be obtained.

As the positive electrode material of the lithium ion secondary battery, positive electrode active materials formed of lithium transition metal-containing composite oxides such as lithium cobalt composite oxide ($LiCoO_2$) for which synthesis is relatively easy, lithium nickel composite oxide ($LiNiO_2$) that uses nickel less expensive than cobalt, lithium nickel manganese cobalt composite oxide ($LiNi_{1/3}Mn_{1/3}Co_{1/3}O_2$), lithium manganese composite oxide ($LiMn_2O_4$) that uses manganese, and lithium nickel manganese composite oxide ($LiNi_{0.5}Mn_{0.5}O_2$) have been proposed.

In recent years, among these lithium transition metal-containing composite oxides, a ternary-system positive electrode active material formed of lithium nickel manganese cobalt-containing composite oxide (NMC) containing at least nickel, manganese, and cobalt as a transition metal, including lithium nickel manganese cobalt composite oxide ($LiNi_{1/3}Mn_{1/3}Co_{1/3}O_2$), has attracted attention as a material that is excellent in thermal stability, has a high capacity, has also satisfactory cycle characteristics of a battery capacity, and has a low resistance and is capable of obtaining a high output. The lithium nickel manganese cobalt-containing composite oxide is a compound having a layered rock salt type crystal structure that is similar to lithium cobalt composite oxide, lithium nickel composite oxide, and the like.

The lithium transition metal-containing composite oxide has been developed focusing on an increase in output by reducing its internal resistance. In particular, in power application for an electric car, higher output by further reducing internal resistance is required at a high level.

In order to improve the output characteristics and cycle characteristics of the positive electrode active material formed of a lithium transition metal-containing composite oxide such as lithium nickel-containing composite oxide or lithium nickel manganese cobalt-containing composite oxide, it is important to constitute the lithium transition metal-containing composite oxide with particles having a small particle size and a narrow particle size distribution. Particles having a small particle size have a large specific surface area, and when such particles are used as a positive electrode active material, a reaction area with an electrolyte can be sufficiently secured. Furthermore, the particles form a thin positive electrode, and a movement distance of lithium ions between a positive electrode and a negative electrode can be shortened. Therefore, by using particles having a small particle size, positive electrode resistance can be reduced. Furthermore, by using particles having a narrow particle size distribution, a voltage to be applied to particles in an electrode can be made uniform, and therefore a decrease in battery capacity due to selective degradation of fine particles can be suppressed.

In order to further improve the output characteristics, it has been researched and developed that the particle structure of the lithium transition metal-containing composite oxide is improved. For example, in order to improve the output characteristics, it is conceivable that forming of a space section which an electrolyte can enter inside the positive electrode active material is effective. By adopting such a structure, as compared with a positive electrode active material with a solid structure having the same degree of particle size, the reaction area with the electrolyte can be increased. Therefore, the positive electrode resistance can be considerably reduced. Note that it is known that the positive electrode active material inherits the particle properties of a transition metal-containing composite hydroxide serving as a precursor thereof. That is, in order to obtain the positive electrode active material having a space section, it is necessary to appropriately control the particle size, the particle size distribution, the particle structure, and the like of secondary particles of the transition metal-containing composite hydroxide serving as a precursor of the positive electrode active material.

For example, JP 2012-246199 A and WO 2012/131881 A1 disclose a method for manufacturing transition metal-containing composite hydroxide particles serving as a precursor of a positive electrode active material by a crystallization reaction clearly separated into two stages of a nuclear generation process of mainly performing nuclear generation and a particle growth process of mainly performing particle growth. In the method, by appropriately adjusting a pH value and a reaction atmosphere in the nuclear generation process and the particle growth process, transition metal-containing composite hydroxide particles having a small particle size, a narrow particle size distribution, and formed of a low-density center section including fine primary particles and a high-density outer shell section including plate-shaped or needle-shaped primary particles are obtained, and a positive electrode active material obtained from such composite hydroxide particles has a hollow structure, has a large contact area with an electrolyte solution, and can improve output characteristics.

WO 2014/181891 A1 and JP 2018-104276 A disclose a method for manufacturing transition metal-containing composite hydroxide particles, the method including: a nuclear generation process of performing nuclear generation by controlling a pH value of an aqueous solution for nuclear generation containing at least a transition metal-containing metal compound and an ammonium ion supplier so as to be within a range of 12.0 or more and 14.0 or less; and a particle growth process of growing particles by controlling a pH value of an aqueous solution for particle growth containing the generated nuclei so as to be lower than the pH value in the nuclear generation process and within a range of 10.5 or more and 12.0 or less, in which atmosphere control of setting an atmosphere of the nuclear generation process and an initial stage of the particle growth process to a non-oxidizing atmosphere, switching the atmosphere to an oxidizing atmosphere at a predetermined timing in the particle growth process, and then switching the atmosphere to the non-oxidizing atmosphere again is performed at least once. According to this method, it is possible to obtain transition metal-containing composite hydroxide particles having a small particle size, a narrow particle size distribution, and having a center section formed of an aggregation of plate-shaped or needle-shaped primary particles, and two laminated structures formed outside the center section each of which a low density layer formed of an aggregation of fine primary particles and a high density layer formed of an aggregation of plate-shaped primary particles are alternately laminated.

A positive electrode active material using the transition metal-containing composite hydroxide particles as a precursor has a small particle size, a narrow particle size distribution, and a hollow structure or a multilayer structure having a space section. Therefore, in a secondary battery using the positive electrode active material, it is possible to simultaneously improve battery capacity, output characteristics, and cycle characteristics.

CITATION LIST

Patent Literature

Patent Literature 1: JP 2012-246199 A
Patent Literature 2: WO 2012/131881 A1
Patent Literature 3: WO 2014/181891 A1
Patent Literature 4: JP 2018-104276 A

SUMMARY OF INVENTION

Technical Problem

However, since there is room for improvement in output characteristics of the positive electrode active materials described in these literatures, further improvement in output characteristics is required.

Furthermore, the secondary particles having a hollow structure or a multilayer structure having a space section as described above have smaller mechanical strength than secondary particles having a dense structure, and may collapse and the internal structure thereof may be damaged when a force such as compression or rolling is applied to a positive electrode active material in a battery manufacturing process. When the internal structure of the secondary particles is damaged, there is a possibility that battery capacity, output characteristics, and cycle characteristics expected for the positive electrode active material cannot be obtained.

Therefore, an object of the present invention is to further improve output characteristics of a positive electrode active material including secondary particles having a hollow structure or a multilayer structure having a space section, capable of contributing to improvement of the output characteristics, and to enhance mechanical strength of the positive electrode active material.

Solution to Problem

A positive electrode active material for a lithium ion secondary battery of an aspect of the present invention includes:

lithium transition metal-containing composite oxide particles having a composition represented by general formula (A): $Li_{1+u}Ni_xMn_yCo_zM_tO_2$, where $-0.05 \leq u < 0.5$, $x+y+z+t=1$, $0.3 \leq x \leq 0.9$, $0 \leq y \leq 0.5$, $0 \leq z \leq 0.5$, $0 < t \leq 0.05$, and M is one or more additive elements selected from Mg, Al, Si, Ca, Ti, V, Cr, Zr, Nb, Mo, Hf, Ta, and W, and a layered rock salt type crystal structure, in which the lithium transition metal-containing composite oxide particle are composed of secondary particles each formed of an aggregation of primary particles, the secondary particles have a 50% cumulative diameter d50 of 3.0 μm or more and 7.0 μm or less, the 50% cumulative diameter d50 being determined from a particle size distribution measured value, a BET specific surface area of 2.0 m²/g or more and 5.0 m²/g or less, a tap density of 1.0 g/cm³ or more and 2.0 g/cm³ or less, and an oil absorption amount of 30 ml/100 g or more and 60 ml/100 g or less, and for each of a plurality of primary particles having a primary particle size within a range of 0.1 μm or more and 1.0 μm or less among the primary particles, when a concentration of the additive element M is measured at a plurality of locations by cross-sectional STEM or TEM-EDX analysis, and a coefficient of variation of the concentration of the additive element M, which is a value obtained by dividing a standard deviation of the concentration of the additive element M by an average concentration of the additive element M, is calculated, the coefficient of variation is 1.5 or less.

The volume of a linking section between the primary particles per primary particle, obtained from the total volume of the linking section in a binarized image obtained by binarizing a three-dimensional observation image of the secondary particles, the total volume being specified using a watershed algorithm from the binarized image, and the number of the primary particles in the binarized image, is preferably $5 \times 10^5$ nm³ or more and $9 \times 10^7$ nm³ or less. The volume of the linking section per primary particle is more preferably $8 \times 10^5$ nm³ or more and $9 \times 10^6$ nm³ or less.

The volume of the linking section per primary particle can be determined by an evaluation method including: (a) a process of obtaining a binarized image from a three-dimensional observation image of the secondary particles; (b) a process of specifying primary particles, a linking section between the primary particles, and the number of the primary particles from the obtained binarized image by a watershed algorithm; and (c) a process of determining the volume of the linking section per primary particle.

The 50% cumulative diameter d50 of the secondary particles is preferably 4.0 μm or more and 6.0 μm or less.

[(d90−d10)/d50], where d10 is a 10% cumulative diameter determined from a particle size distribution measured value, and d90 is a 90% cumulative diameter determined from the particle size distribution measured value, which is an index indicating spread of a particle size distribution of the secondary particles, is preferably 1.0 or less.

A value of d90/d10 of the secondary particles is preferably 1.0 or more and 2.0 or less.

The secondary particle preferably has an aggregated section, one or more communication holes communicating with an outer periphery section of the aggregated section, and two or more space sections present inside the aggregated section and communicating with the communication holes. The number of the communication holes is preferably two or more. The two or more space sections preferably communicate with the one or more communication holes or another space section.

The additive element M is preferably one or more selected from Mg, Al, Si, Ti, Zr, Nb, Mo, and W. The additive element M is preferably W.

A lithium ion secondary battery of an aspect of the present invention includes a positive electrode, a negative electrode, a separator, and a non-aqueous electrolyte, in a case of a non-aqueous electrolyte secondary battery, or includes a positive electrode, a negative electrode, and a solid electrolyte, in a case of a solid electrolyte secondary battery, in which the positive electrode active material for a lithium ion secondary battery of an aspect of the present invention is used as a positive electrode active material used in the positive electrode.

Advantageous Effects of Invention

In the positive electrode active material for a lithium ion secondary battery of an aspect of the present invention, sufficiently high mechanical strength is obtained, and a contact area with a non-aqueous electrolyte or a solid electrolyte is sufficiently large, and therefore insertion and de-insertion of lithium ions at a particle interface are promoted, and output characteristics of the positive electrode active material can be improved. Therefore, a lithium ion secondary battery to which the positive electrode active material for a lithium ion secondary battery of an aspect of the present invention is applied can provide high output characteristics, and therefore industrial significance thereof is very large.

BRIEF DESCRIPTION OF DRAWINGS

FIG. 3(a) is a binarized image before primary particle separation, FIG. 3(b) is a binarized image after primary particle separation, and FIG. 3(c) is a binarized image of a linking section between primary particles.

DESCRIPTION OF EMBODIMENTS

Figure 1:
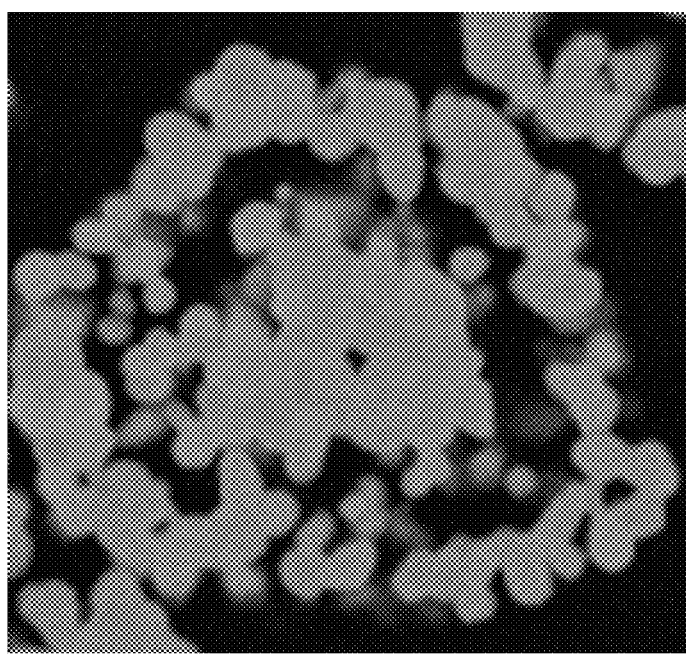
FIG. 1 is an SEM image of a cross section of secondary particles of a positive electrode active material for a lithium ion secondary battery of Example 1.

1. Positive Electrode Active Material for Lithium Ion Secondary Battery

A positive electrode active material for a lithium ion secondary battery (hereinafter, referred to as a "positive electrode active material") of an embodiment of the present invention includes lithium transition metal-containing composite oxide particles (hereinafter, referred to as "composite oxide particles"), and satisfies the following requirements (1) to (7).

(1) Composition

The composite oxide particles have a composition represented by general formula (A) : $Li_{1+u}Ni_xMn_yCo_zM_tO_2$, where $-0.05 \leq u \leq 0.5$, $x+y+z+t=1$, $0.3 \leq x \leq 0.9$, $0 \leq y \leq 0.5$, $0 \leq z \leq 0.5$, $0 < t \leq 0.05$, and M is one or more additive elements selected from Mg, Al, Si, Ca, Ti, V, Cr, Zr, Nb, Mo, Hf, Ta, and W.

In the positive electrode active material of the present embodiment, a value of u indicating an excessive amount of lithium (Li) is $-0.05$ or more and 0.5 or less. The value of u is preferably 0 or more and 0.50 or less, and more preferably 0 or more and 0.35 or less. By regulating the value of u to be within the above range, it is possible to improve output characteristics and battery capacity of a lithium ion secondary battery using this positive electrode active material as a positive electrode material. On the other hand, when the value of u is less than $-0.05$, positive electrode resistance of the secondary battery is large, and therefore there is a possibility that the output characteristics cannot be improved. When the value of u exceeds 0.5, not only initial discharge capacity decrease, but also there is a possibility that the positive electrode resistance increases.

Nickel (Ni) is an element that contributes to potential increase and capacity enlargement of a secondary battery, and a value of x indicating the content of nickel is 0.3 or more and 0.9 or less. The value of x is preferably 0.4 or more and 0.7 or less, and more preferably 0.4 or more and 0.6 or less. When the value of x is less than 0.3, there is a possibility that the energy density of a secondary battery using this positive electrode active material cannot be sufficiently improved. When the value of x exceeds 0.9, the content of another element that improves output characteristics and durability characteristics decreases, and there is a possibility that characteristics as a positive electrode active material cannot be sufficiently obtained.

Manganese (Mn) is an element that contributes to improvement of thermal stability, and a value of y indicating the content of manganese is 0 or more and 0.5 or less. The value of y is preferably 0.1 or more and 0.4 or less. When the value of y exceeds 0.5, Mn elutes from the positive electrode active material during high-temperature operation, and charge and discharge cycle characteristics may deteriorate.

Cobalt (Co) is an element that contributes to improvement of charge and discharge cycle characteristics and output characteristics, and a value of z indicating the content of cobalt is 0 or more and 0.5 or less. The value of z is preferably 0.1 or more and 0.4 or less. When the value of z exceeds 0.5, initial discharge capacity of a secondary battery using this positive electrode active material may decrease.

The positive electrode active material of the present embodiment can contain the following additive element M. As the additive element M, it is possible to use one or more selected from magnesium (Mg), aluminum (Al), silicon (Si), calcium (Ca), titanium (Ti), vanadium (V), chromium (Cr), zirconium (Zr), niobium (Nb), molybdenum (Mo), hafnium (Hf), tantalum (Ta), and tungsten (W).

The additive element M is preferably at least one selected from the group consisting of Mg, Al, Si, Ti, Zr, Nb, Mo, and W, and is more preferably W.

A value of t indicating the content of the additive element M is more than 0 and 0.05 or less. The value of t is preferably 0.001 or more and 0.03 or less. When the value of t exceeds 0.05, a metal element that contributes to a Redox reaction decreases, and therefore battery capacity of the secondary battery decreases.

The additive element M may be dispersed inside the composite oxide particles or may be coated on a surface of the composite oxide particles. In any case, it is preferable to control the content of the additive element M to be within the above range.

The composite oxide particles of the present embodiment are preferably constituted by a lithium nickel manganese cobalt-containing composite oxide (NMC) containing Ni, Mn, and Co as main transition metals. In this case, the composite oxide particles preferably have a composition represented by general formula (B): $Li_{1+u}Ni_xMn_yCo_zM_tO_2$, where $-0.05 \leq u \leq 0.5$, $x+y+z+t=1$, $0.3 \leq x \leq 0.7$, $0.15 \leq y \leq 0.4$, $0.15 \leq z \leq 0.4$, $0 < t \leq 0.05$, and M is one or more additive elements selected from Mg, Al, Si, Ca, Ti, V, Cr, Zr, Nb, Mo, Hf, Ta, and W.

The composition of the positive electrode active material can be confirmed by, for example, Rietveld analysis of parameters obtained by inductively coupled plasma emission spectrometry and powder X-ray diffraction.

When the positive electrode active material of the present embodiment has the composition of the general formula (A) or (B), the positive electrode active material has a layered rock salt type hexagonal crystal structure.

(2) Particle Structure

In the positive electrode active material of the present embodiment, the composite oxide particles are constituted by secondary particles each formed of an aggregation of a plurality of primary particles.

The secondary particle preferably has an aggregated section, one or more communication holes communicating with an outer periphery section of the aggregated section, and two or more space sections present inside the aggregated section and communicating with the communication holes.

The two or more space sections preferably communicate with the one or more communication holes or another space section. The number of the communication holes is also preferably two or more.

When the composite oxide particles have such a secondary particle structure, particle properties of the positive electrode active material of the embodiment of the present invention described later can be easily achieved.

When the one or more communication holes in the outer periphery section does not communicate with a space section inside the particle, the space section is isolated, an electrolyte cannot sufficiently enter the composite oxide particle (secondary particle), and a sufficient reaction field cannot be secured. Therefore, in a secondary battery using this positive electrode active material, desired battery performance cannot be sufficiently exhibited in some cases. Each of the two or more internal space sections can directly communicate with the one or more communication holes in the outer periphery section. Alternatively, each of the two or more internal space sections can communicate with the one or more communication holes in the outer periphery section through another communication hole.

With such a structure, an electrolyte sufficiently enters the space sections inside the particle through the one or more communication holes in the outer periphery section. Therefore, lithium can be de-inserted and inserted not only on a surface of the secondary particle but also inside the secondary particle, a sufficient reaction field is secured, and the internal resistance of the battery can be largely reduced.

Therefore, when a lithium ion secondary battery is constituted using a positive electrode active material having such a structure as a positive electrode material, the output characteristics can be further improved.

(3) Particle Size

In the positive electrode active material of the present embodiment, the secondary particles have a 50% cumulative diameter d50 of 3.0 μm or more and 7.0 μm or less, the 50% cumulative diameter d50 being determined from a particle size distribution measured value. The 50% cumulative diameter d50 of the secondary particles is preferably 4.0 μm or more and 6.5 μm or less, and more preferably 4.0 μm or more and 6.0 μm or less.

More specifically, the 50% cumulative diameter d50 is a particle size at which a cumulative volume determined from a volume integrated value measured with a laser light diffraction scattering particle size analyzer is 50% of the total volume of all particles (when a cumulative curve of the particle size distribution is determined by setting the total volume to 100%, the 50% cumulative diameter d50 is a particle size at a point where the cumulative curve is 50%).

When the 50% cumulative diameter d50 of the secondary particles constituting the positive electrode active material is within the above range, not only battery capacity per unit volume of a secondary battery using this positive electrode active material can be increased, but also safety and output characteristics can be improved.

On the other hand, when the 50% cumulative diameter d50 is less than 3.0 μm, a filling property of the positive electrode active material decreases, and there is a possibility that battery capacity per unit volume cannot be increased. When the 50% cumulative diameter d50 exceeds 7.0 μm, a reaction area of the positive electrode active material decreases, and an interface with an electrolyte is decreased. Therefore, there is a possibility that it is difficult to improve output characteristics.

(4) BET Specific Surface Area

In the positive electrode active material of the present embodiment, the secondary particles have a BET specific surface area of 2.0 $m^2$/g or more and 5.0 $m^2$/g or less. The BET specific surface area is preferably 2.5 $m^2$/g or more and 4.5 $m^2$/g or less.

The BET specific surface area of the secondary particles is an index indicating particle properties (contact area with an electrolyte) of the positive electrode active material. When the secondary particle has an aggregated section, one or more communication holes communicating with an outer periphery section of the aggregated section, and two or more space sections present inside the aggregated section and communicating with the communication holes, the BET specific surface area of the secondary particles represents a surface area including the communication holes (opening sections) present in the outer periphery section of the secondary particle and fine cavities (space sections) inside the secondary particle.

The BET specific surface area is measured by a BET method using nitrogen gas adsorption.

When the BET specific surface area of the secondary particles is less than 2.0 m$^2$/g, in a case where a secondary battery is formed using this positive electrode active material, a reaction area with an electrolyte cannot be sufficiently secured, and there is a possibility that output characteristics cannot be sufficiently improved. When the BET specific surface area of the secondary particles exceeds 5.0 m$^2$/g, the reaction area between the positive electrode active material and the electrolyte is too large, and durability of the secondary battery may be deteriorated.

(5) Tap Density

In the positive electrode active material of the present embodiment, the secondary particles have a tap density of 1.0 g/cm$^3$ or more and 2.0 g/cm$^3$ or less. The tap density is preferably 1.0 g/cm$^3$ or more, and more preferably 1.2 g/cm$^3$ or more.

The tap density is an index of density reflecting the amount of solid domains inside a particle, for example, in a spherical particle.

When the tap density is less than 1.0 g/cm$^3$, even if the BET specific surface area is increased, the amount of solid domains in the secondary particles is small, and durability of the secondary battery may be deteriorated. An upper limit of the tap density is not particularly limited. However, in the positive electrode active material of the present embodiment, when the secondary particle has an aggregated section, one or more communication holes communicating with an outer periphery section of the aggregated section, and two or more space sections present inside the aggregated section and communicating with the communication holes, the upper limit under normal manufacturing conditions is about 2.0 g/cm$^3$.

The tap density is a bulk density after a powder sample collected in a vessel is tapped 100 times according to JIS Z-2504, and can be measured using a shaking specific gravity measuring device.

(6) Oil Absorption Amount

In the positive electrode active material of the present embodiment, the secondary particles have an oil absorption amount of 30 ml/100 g or more and 60 ml/100 g or less. The oil absorption amount is preferably 35 ml/100 g or more and 55 ml/100 g or less.

The oil absorption amount is an index indicating the total volume of the space sections (all cavities) inside the secondary particles. The oil absorption amount is determined by operation according to a procedure described in "JIS K 6217-4: 2008 (Carbon black for rubber—Basic characteristics—Part 4: How to determine oil absorption amount (including compressed sample))". However, since the operation process is complicated, the oil absorption amount is generally measured using an oil absorption amount measuring apparatus put on the market in accordance with JIS described above. Note that di-n-butyl phthalate (DBP) is used as measurement oil (oil), and a measurement result is calculated in terms of an oil absorption amount per 100 g of a sample. Therefore, a unit thereof is represented by "ml/100 g".

When the oil absorption amount is less than 30 ml/100 g, a sufficient space section is not formed inside the secondary particle, and there is a possibility that a sufficient BET specific surface area cannot be obtained. On the other hand, when the absorption amount exceeds 60 ml/100 g, many space sections are structurally present inside the secondary particle, a bulk density decreases, a filling property decreases, and there is a possibility that battery capacity per unit volume cannot be sufficiently obtained when a secondary battery is constituted.

(7) Coefficient of Variation of Concentration of Additive Element M

In the positive electrode active material of the present embodiment, a coefficient of variation (CV) indicating a variation in the concentration of the additive element M in the primary particles forming the secondary particles is 1.5 or less. The coefficient of variation (CV) is preferably 1.3 or less, and more preferably 1.2 or less.

The coefficient of variation of the concentration of the additive element M is an index indicating a variation of the concentration of the additive element M in the entire primary particles including the inside of the primary particles and grain boundaries.

The coefficient of variation of the concentration of the additive element M is determined as follows. First, the positive electrode active material is sectioned with a focused ion beam apparatus (FIB), an ion milling apparatus, or the like to expose a cross section of the secondary particles. Using a scanning transmission electron microscope (STEM) or a transmission electron microscope (TEM), two linked primary particles each having a primary particle size within a range of 0.1 μm or more and 1.0 μm or less in the cross section of the secondary particles are targeted, a plurality of locations of each of the two primary particles is irradiated with an electron beam, and energy dispersive X-ray analyzer (EDX) analysis is performed on energy of a generated characteristic X-ray of the additive element M to determine the concentration of the additive element M at each location.

From the obtained data of the concentration of the additive element M, an average concentration (μ) of the additive element M and a standard deviation (σ) of the concentration of the additive element M are determined.

The coefficient of variation (CV) of the concentration of the additive element M is determined by a formula: $CV = \sigma/\mu$.

When the coefficient of variation (CV) of the concentration of the additive element M exceeds 1.5, a distribution of the additive element M in the primary particles and/or the secondary particles is biased, and in a secondary battery using this positive electrode active material, battery performance such as battery capacity or output characteristics may be impaired.

(8) Volume of Linking Section Per Primary Particle

In the positive electrode active material of the present embodiment, the volume of a linking section between the primary particles per primary particle, obtained from the total volume of the linking section in a binarized image obtained by binarizing a three-dimensional observation image of the secondary particles, the total volume being specified using a watershed algorithm from the binarized image, and the number of the primary particles in the binarized image, is preferably 5×10$^5$ nm$^3$ or more and 9×10$^7$ nm$^3$ or less.

The value of the volume of the linking section per primary particle is a parameter that governs the strength of the secondary particles constituting the positive electrode active material. By regulating the volume of the linking section per primary particle within the above range, in the positive electrode active material of the present embodiment having the above characteristics, particularly, in the positive electrode active material having a structure in which the secondary particle has an aggregated section, one or more communication holes communicating with an outer periphery section of the aggregated section, and two or more space sections present inside the aggregated section and communicating with the one or more communication holes, sufficiently large mechanical strength can be obtained, and output characteristics can be further improved without deteriorating any of the battery capacity, output characteristics, and cycle characteristics.

When the volume of the linking section per primary particle is less than $5\times10^5$ nm$^3$, the positive electrode active material is crushed in a crushing process, and fine powder is generated to deteriorate battery characteristics. On the other hand, when the volume of the linking section per primary particle exceeds $9\times10^7$ nm$^3$, a predetermined BET specific surface area, tap density, or oil absorption amount cannot be obtained. That is, as the primary particles become larger, the porosity of the secondary particles decreases, a reaction area between an electrolyte and the positive electrode active material decreases, and therefore battery characteristics are deteriorated.

The volume of the linking section per primary particle is preferably $8\times10^5$ nm$^3$ or more and $9\times10^6$ nm$^3$ or less, and more preferably $1\times10^6$ nm$^3$ or more and $8\times10^6$ m$^3$ or less in consideration of a balance between the strength and porosity of the secondary particles.

Hereinafter, how to determine a value of the volume of the linking section per primary particle will be specifically described. This value can be basically determined by an evaluation method including: (a) a process of obtaining a binarized image from a three-dimensional observation image of the secondary particles; (b) a process of specifying primary particles, a linking section between the primary particles, and the number of the primary particles from the obtained binarized image by a watershed algorithm; and (c) a process of determining the volume of the linking section per primary particle.

(a) Process of Obtaining Binarized Image from Three-dimensional Observation Image of Secondary Particles In this process, first, a three-dimensional observation image of the secondary particles is obtained. Observation of the secondary particles is performed by selecting an evaluation apparatus having appropriate spatial resolution and observation conditions in view of the size of the secondary particles and an expected contact area with a probe. For example, for secondary particles having a particle size of several 10 nm or more and several 100 μm or less, a scanning electron microscope (hereinafter, referred to as "SEM") is preferably used. For particles having a particle size of several nm or more and several 100 nm or less, an image can be observed using a transmission electron microscope (hereinafter, referred to as "TEM"). A scanning transmission electron microscope (hereinafter, referred to as "STEM") can also be used for the secondary particles having any particle size.

Note that in the present embodiment, an observation image including the plurality of secondary particles can be used as an observation image to be acquired first. That is, a process of determining the volume of the linking section per primary particle described later can be performed on the observation image including the plurality of secondary particles. That is, the observation image is not limited to an observation image of a single secondary particle. However, an observation image of a single secondary particle can also be used.

In a case of SEM observation, a three-dimensional observation image of the secondary particles can be acquired using image analysis software from a set of two-dimensional observation images obtained by repeating cross-sectional processing with a constant processing width and SEM observation (that is, obtained for each depth direction) using a SEM apparatus equipped with a focused ion beam processing observation apparatus (FIB).

In a case of TEM, a three-dimensional observation image of the secondary particles can be acquired by three-dimensionally constructing two-dimensional observation images captured at different inclination angles by a tomography method.

Image acquisition conditions can be appropriately changed according to the size of a particle to be observed. For example, in SEM observation, in general, each measurement parameter can be changed based on the following way of thinking.

<Acceleration Voltage>

As an acceleration voltage is higher, information on a portion deeper from an outermost surface of a sample is mixed in an observation image. That is, even though the observation image is a two-dimensional image, information in a depth direction (such as information on particles buried in a cross section) is also mixed in the observation image. Therefore, it is preferable to use a condition of a low acceleration voltage as much as possible within a range where necessary spatial resolution can be secured.

<Current>

In general, as a current value is lower (an aperture size is smaller), spatial resolution is higher, but luminance decreases, a signal amount decreases, noise increases, and an image quality deteriorates. Therefore, a condition under which the spatial resolution and the image quality are balanced is preferably selected.

<Operation Distance>

When an operation distance is shortened in SEM observation, aberration of a lens is reduced, and resolution is increased. In particular, when an operation distance is shortened at the time of observation under a low acceleration voltage condition, spatial resolution is increased.

<Magnification and Number of Pixels in Observation Image>

As magnification increase, spatial resolution is increased, but an observable range and the number of primary particles are reduced. Therefore, a condition to be balanced is selected in consideration of the number of primary particles required for observation and the spatial resolution.

As the number of pixels increases, resolution of an image is increased, but there is also a contradiction such as a longer image acquisition time. Therefore, an appropriate value is preferably selected according to required image resolution.

The size of one pixel (hereinafter, also referred to as "pixel" in a case of two dimensions, and as "voxel" in a case of three dimensions) is a minimum unit of various types of processing at the time of image analysis. Magnification and the number of pixels, and furthermore, the dimension of one pixel in real space are determined with resolution required for the processing in the image analysis in mind.

<Beam Dwell Time Per Sweep>

As dwell time increase, a signal amount increases, noise is reduced, and image quality is improved, but there is a contradiction that observation time increases. Therefore, an appropriate condition is selected within a necessary range.

<Detector>

Electrons generated by electron beam incidence on a sample are roughly divided into secondary electrons (inelastic scattered electrons) and reflected electrons (elastic scattered electrons). In SEM, in general, a signal ratio between secondary electrons and reflected electrons in an observation image is adjusted by adjusting various detectors and detection conditions to obtain a target observation image. When image analysis is performed, in many cases, a substance is separated according to a contrast based on a composition. Furthermore, in image analysis, since a contrast derived from unevenness of a sample generated at the time of cross-sectional processing or the like of the sample is an obstacle, a secondary electron image in which the contrast derived from unevenness is strongly generated by an edge effect is not desirable. From such a viewpoint, an observation image at the time of performing image analysis is desirably a reflected electron image including reflected electrons.

Note that, in a case of TEM, as an accelerating voltage increases, spatial resolution increases, but some samples may be damaged by electron beam irradiation. Therefore, when such samples are handled, it is possible to make changes such as reducing the accelerating voltage or a current value.

In general, an axis of a three-dimensional constructed image is defined such that the horizontal direction of a two-dimensional observation image is an X axis, the vertical direction thereof is a Y axis, and when SEM is adopted, a cross-sectional processing direction by FIB is a Z axis.

The two-dimensional observation image is affected by a stage drift or the like at the time of observation, and the X position and the Y position are slightly shifted in many cases. Therefore, when the two-dimensional observation images are superimposed, least square fitting can be performed between adjacent images to align the X position and the Y position.

In a case of TEM, a three-dimensional image can be constructed by a tomography method. Specifically, two-dimensional observation images captured at different inclination angles are obtained. At this time, Au nano powder or the like is added to a sample in advance. Then, marking position information is put into the sample. By performing alignment by least square fitting in a similar manner to SEM based on the position information in the sample, a three-dimensional image can be constructed.

<Pixel Size Equalization Process>

Before the binarization process, it is also possible to perform, on the observation image of the sample, a pixel size equalization process of equalizing the pixel sizes of the X axis and the Y axis or the pixel sizes of the X axis, the Y axis, and the Z axis in consideration of an incident angle of an electron beam of an electron microscope used to obtain the observation image with respect to the secondary particle.

<Noise Removal Process>

Noise included in the observation image in which the pixel size is equalized may be an obstacle in the binarization processing. Therefore, a noise removal process can be performed as necessary. As a specific method of the noise removal process, a known noise removal technique adopted in a general image processing technique can be adopted.

<Binarization Process>

By the binarization process, a binarized image obtained by binarizing the observation image of the sample after the size equalization process is obtained. Specifically, a substance to be analyzed and other substances are separated by binarization processing. The binarization processing is, for example, processing of setting a range of values of black and white intensity (glay scale) for each pixel of a monochrome image and separating a substance.

<Binarized Image Smoothing Process>

Morphology processing can also be performed on the binarized image. The "morphology processing" in the present specification refers to processing to be performed by combining several times expansion and contraction of a pixel of an island (or sea) portion in a sea-island structure when a particle image is an island and an image of a portion other than the particle is a sea, and is processing intended to smooth a binarized image and/or remove (fill) an isolated point.

However, in the present embodiment, it is arbitrary whether or not to perform the binarized image smoothing process according to a condition for acquiring an observation image. Although smoothing of an image is achieved by the binarized image smoothing process, omitting the binarized image smoothing process eliminates loss of information caused by smoothing of the image. Since the linking section between the primary particles are indicated in units of several pixels, it is possible to appropriately select whether or not to perform the binarized image smoothing process according to a condition for acquiring the observation image.

(b) Process of Specifying Primary Particles, a Linking Section Between the Primary Particles, and the Number of Primary Particles from Obtained Binarized Image by Watershed Algorithm This is a process of obtaining a binarized image in which primary particles are separated and recognized using a watershed algorithm (watershed segmentation), and performing labeling processing on the binarized image.

The labeling processing is processing of recognizing a region in which pixels recognized as the same substance as continuous as one region and performing numbering on a binarized image of secondary particles. By performing this processing, it is possible to individually recognize the primary particles separated using the watershed algorithm and to grasp the number (total number) of the primary particles constituting the secondary particles.

A specific method for evaluating the number at this time is not limited, and clustering can be performed in which particles surrounded by a portion where pixels are not in contact with each other is defined as one cluster, that is, one primary particle. Furthermore, the primary particles can be distinguished from each other later by numbering, and the total number of the individual primary particles can also be simply obtained.

In order to determine whether or not pixels are continuous, there is a method for determining that the pixels are continuous if pixels (8 surrounding pixels in a case of two dimensions, and 26 surrounding pixels in a case of three dimensions) in contact with a pixel of interest at a point or more (point, line, or surface), pixels (4 surrounding pixels in a case of two dimensions, and 18 surrounding pixels in a case of three dimensions) in contact with the pixel of interest at a line or more (line or surface), or pixels (6 surrounding pixels only in a case of three dimensions) in contact with the pixel of interest at a surface are the same substance, and any method can be arbitrarily selected.

The watershed algorithm is a well-known technique in image processing, and is a method for dividing an image region having a location whose boundary is ambiguous. Specifically, the watershed algorithm is a method for setting a boundary at an appropriate position between high luminance locations according to each luminance when a portion where a distance of an island portion from a sea portion is large (that is, the center of the island or a portion in the vicinity thereof) is set to high luminance in a binarized image having a sea-island structure. This makes it possible to separate and recognize a boundary between objects in contact with each other in the image.

When the watershed algorithm is applied, if even at least one pixel (one pixel or one voxel) exists as a portion having luminance, the portion can be identified as a high luminance location. However, the present invention is not limited thereto, and only when a plurality of pixels exist as a portion having luminance according to the type of a target sample, an observation image acquisition condition, and other reasons, the portion can be identified as a high luminance location.

(c) Process of Determining Volume of Linking Section Per Primary Particle

In this process, based on the data regarding the primary particles, a linking section between the primary particles, and the number of the primary particles, that are specified using a watershed algorithm from the binarized image obtained by binarizing the three-dimensional observation image of the single or the plurality of secondary particles in the previous process, a value of the total volume of the linking section between the primary particles is obtained, and the volume of the linking section per primary particle is determined from the total volume of the linking section between the primary particles and the number of the primary particles.

The degree of linking of the primary particles in the secondary particles having a porous structure is evaluated by the volume of the linking section per primary particle.

In this process, a value of the total volume of the linking section between the primary particles constituting the secondary particles is first obtained. Hereinafter, a method for acquiring the total volume between the primary particles will be exemplified. However, this method is not limited to the following examples.

The total volume of the primary particles before separation is obtained from the number of pixels of the binarized image before separation of the primary particles by the watershed algorithm. Next, the total volume of the primary particles after separation is obtained from the number of pixels of the binarized image after separation of the primary particles by the watershed algorithm. Then, by subtracting the total volume of the primary particles after separation from the total volume of the primary particles before separation, the total volume of the linking section between the primary particles can be obtained.

Figure 3:
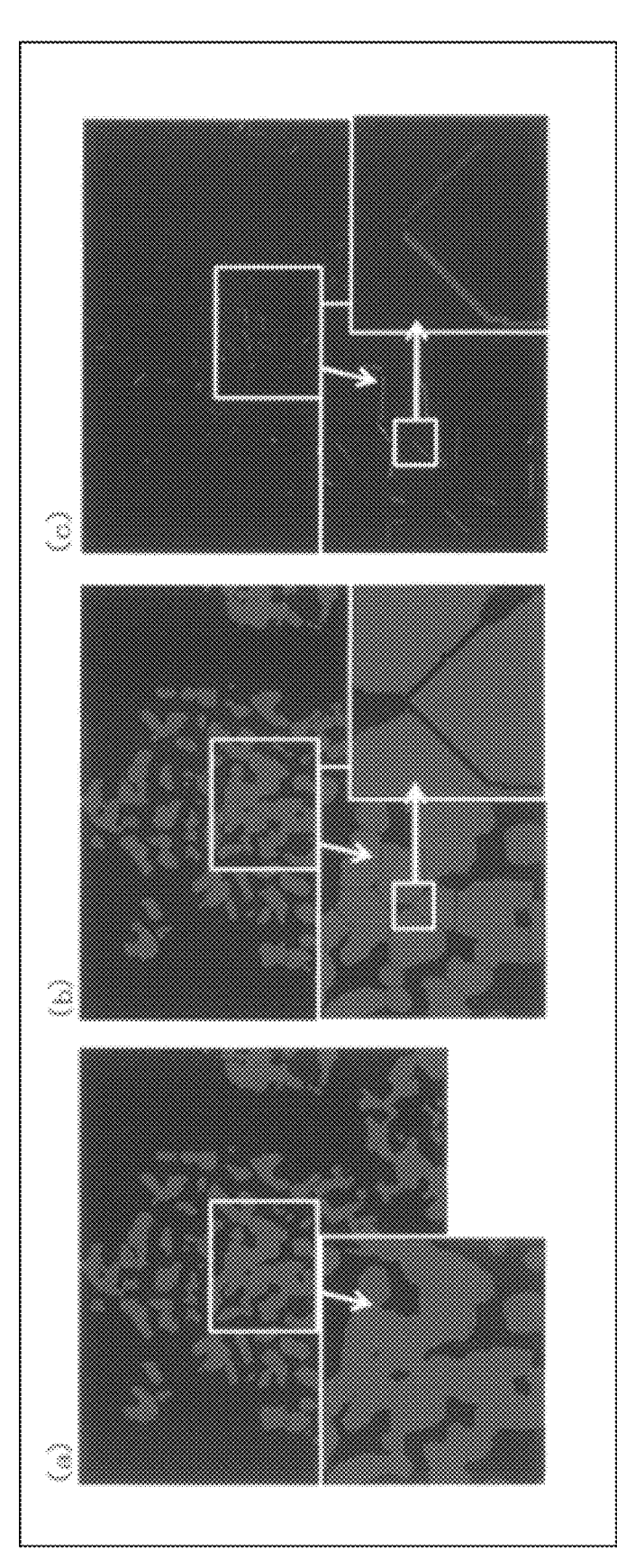
FIGS. 3(a) to 3(c) are conceptual diagrams for describing a means for obtaining the volume of the linking section per primary particle.

More specifically, by subtracting the area of the primary particles obtained from a primary particle image after separation as illustrated in FIG. 3(b) from the area of the primary particles obtained from a primary particle image before separation in a binarized image according to a depth in the Z-axis direction before the separation of the primary particles by the watershed algorithm as illustrated in FIG. 3(a) to obtain the area (number of pixels: pixel) of the linking section between the primary particles, and adding up the areas between the primary particles according to the depth in the Z-axis direction, the total volume (number of pixels: voxel) of the linking section can be obtained.

Alternatively, a binarized image of the linking section between the primary particles is obtained from the data of the binarized image before separation of the primary particles by the watershed algorithm and the data of the binarized image after the separation, and the total volume of the linking section between the primary particles can be obtained from the number of pixels of the binarized image of the linking section between the primary particles.

More specifically, from a primary particle image before separation in a binarized image according to a depth in the Z-axis direction before separation of the primary particles by the watershed algorithm as illustrated in FIG. 3(a) and a primary particle image after the separation as illustrated in FIG. 3(b), a binarized image of the linking section between the primary particles as illustrated in FIG. 3(c) is obtained. Furthermore, the area (number of pixels: pixel) of the linking section between the primary particles is obtained from the binarized image of the linking section between the primary particles. Then, by adding up the areas between the primary particles according to the depth in the Z-axis direction, the total volume (number of pixels: voxel) of the linking section can be obtained.

In the present embodiment, as described above, the volume of the linking section per primary particle is obtained from the total volume of the linking section between the primary particles and the number of the primary particles specified using the watershed algorithm from a binarized image obtained by binarizing a three-dimensional observation image.

The volume of the linking section can be obtained from a sum of the number of pixels of the linking section and information on the degree of the dimensions of one pixel in the binarized image in the real space without being divided by the number of the primary particles. However, the volume of the linking section is largely affected by the number of the primary particles. Therefore, in the present embodiment, in order to evaluate the degree of crush strength in the secondary particles having a porous structure in more detail, the influence of the number of the primary particles is eliminated by dividing the volume of the linking section by the number of the primary particles.

The image processing in each of the above processes can be implemented by using known software. Examples of such software include "AVIZO" which is image analysis software (manufactured by FEI Company Japan Ltd.). Image processing in all processes and extraction of required numerical data are possible with such image analysis software. However, the present embodiment is not limited to use of such image analysis software, and image analysis in each process and extraction of numerical data can be performed with a plurality of types of known image analysis software.

Note that, when an observation image of a single secondary particle is obtained from an observation image including a plurality of secondary particles, particularly, an observation image including a tertiary particle formed by aggregating a plurality of secondary particles, a linking section between a secondary particle and a secondary particle is specified by the watershed algorithm from a binarized image obtained from the observation image including the plurality of secondary particles, and the single secondary particle is extracted. Then, the above-described process of determining the volume of the linking section per primary particle can be performed.

(9) Particle Size Distribution

Optionally, in the positive electrode active material of the present embodiment, [(d90−d10)/d50], which is an index indicating spread of a particle size distribution of the secondary particles, is preferably 1.0 or less, more preferably 0.7 or less, and still more preferably 0.6 or less. In a positive electrode active material including secondary particles having such a narrow particle size distribution, a ratio of fine particles and coarse particles is small, and therefore a secondary battery using this positive electrode active material is excellent in all of safety, cycle characteristics, and output characteristics.

When [(d90−d10)/d50] exceeds 1.0, the ratio of fine particles and coarse particles in the positive electrode active material increases. For example, when the ratio of fine particles is large, the secondary battery is likely to generate heat due to localized reaction of the fine particles, and in addition to deterioration in safety, the fine particles may be selectively deteriorated to deteriorate cycle characteristics. Furthermore, when the ratio of coarse particles is large, a reaction area between an electrolyte and the positive electrode active material cannot be sufficiently secured, and output characteristics may be poor.

In a case of assuming industrial scale manufacturing, it is not realistic to use a positive electrode active material having an excessively small [(d90−d10)/d50]. Therefore, in consideration of cost and productivity, a lower limit of [(d90−d10)/d50] is preferably about 0.3.

Note that meanings and a method for determining d10 and d90 in the index [(d90−d10)/d50] indicating spread of a particle size distribution are similar to those in the case of d50 described above. d90 means a particle size at which an accumulated volume obtained by accumulating the volume of each particle from a side having a smaller particle size is 90% of the total volume of all particles, and d10 means a particle size at which an accumulated volume obtained by accumulating the volume of each particle from a side having a smaller particle size is 10% of the total volume of all particles.

(10) d90/d10

Optionally, in the positive electrode active material of the present embodiment, a ratio (d90/d10) of a value of d90 to a value of d10 determined from the particle size distribution measured value for the secondary particles is preferably 1.0 or more and 2.0 or less, and more preferably 1.2 or more and 1.8 or less.

When the value of d90/d10 of the secondary particles constituting the positive electrode active material is within the above range, not only battery capacity per unit volume of a secondary battery using this positive electrode active material can be increased, but also safety and output characteristics can be improved. When the value of d90/d10 of the secondary particles exceeds 2.0, a reaction area of the positive electrode active material decreases, and an interface with an electrolyte is decreased. Therefore, there is a possibility that it is difficult to improve output characteristics.

(11) Crystallite Diameter Determined from X-ray Diffraction Diagram of (003) Plane Optionally, as for the composite oxide particles constituting the positive electrode active material of the present embodiment, when the crystallite diameter of the primary particle is determined from a full width at half maximum of a peak of a (003) plane by X-ray diffraction using a Scherrer formula, the crystallite diameter is preferably 300 Å or more and 1500 Å or less, more preferably 400 Å or more and 1300 Å or less, and still more preferably 700 Å or more and 1250 Å or less. A positive electrode active material having a crystallite diameter within such a range has extremely high crystallinity, can reduce positive electrode resistance of a secondary battery, and can improve output characteristics thereof.

When the crystallite diameter of the (003) plane is less than 300 Å, the primary particles are fine, pores present between the primary particles in the positive electrode active material are too fine, and an electrolyte hardly enters the positive electrode active material. Therefore, a reaction area with the electrolyte is reduced, and output characteristics of the secondary battery are deteriorated. When the crystallite diameter of the (003) plane exceeds 1500 Å, the primary particles are too coarse, the ratio of pores in the secondary particles extremely decreases, and an entry path of an electrolyte decreases Therefore, a reaction area with the electrolyte is reduced, and output characteristics of the secondary battery are deteriorated.

2. Method for Manufacturing Positive Electrode Active Material for Lithium Ion Secondary Battery The positive electrode active material of the above embodiment is not limited by a method for manufacturing the positive electrode active material as long as the positive electrode active material has the above-described composition, crystal structure, particle structure, and particle properties.

However, by manufacturing the positive electrode active material of the above embodiment by a manufacturing method described below, a positive electrode active material having the above-described composition, crystal structure, particle structure, and particle properties can be easily manufactured.

Specifically, the positive electrode active material of the above embodiment is obtained by preparing a transition metal-containing composite hydroxide such as a nickel manganese cobalt-containing composite hydroxide by switching between an oxidizing atmosphere and a non-oxidizing atmosphere during a crystallization process, mixing the composite hydroxide or heat-treated particles obtained by heat-treating the composite hydroxide with a lithium compound, and firing the obtained lithium mixture.

Hereinafter, each process will be described in detail by exemplifying a case where the composite oxide particles are lithium nickel manganese cobalt-containing composite oxide particles.

(1) Crystallization Process

Water, a sodium hydroxide aqueous solution, a sodium carbonate aqueous solution, and ammonia water are supplied into a reaction tank in appropriate amounts, and a pre-reaction aqueous solution is prepared such that a pH value based on the liquid temperature of 25° C. is 11 or more and 13 or less, and an ammonium ion concentration is 9 g/L or more and 15 g/L is prepared. It is desirable to prepare a raw material aqueous solution of 1.0 mol/L or more and 3.0 mol/L or less by dissolving nickel sulfate, manganese sulfate, cobalt sulfate, and a compound of the additive element M (a sulfate, a sodium salt, or the like) in water such that a molar ratio of each of the metal elements (Ni, Co, Mn, and M) satisfies the above formula (A). Alternatively, it is also possible to prepare a raw material aqueous solution by dissolving nickel sulfate, manganese sulfate, and cobalt sulfate in water such that a molar ratio of each of the metal elements (Ni, Co, and Mn) satisfies the above formula (A), to separately prepare an aqueous solution containing a compound of the additive element M such that the addition amount of the additive element M satisfies the above formula (A), and then to add the aqueous solution containing the compound of the additive element M to the raw material aqueous solution.

Next, by supplying the raw material aqueous solution to the pre-reaction aqueous solution while blowing a gas in a non-oxidizing atmosphere having an oxygen concentration of 2% by volume or less, such as argon gas or nitrogen, nuclear generation is performed. At this time, it is desirable to appropriately supply a sodium hydroxide aqueous solution, a sodium carbonate aqueous solution, and ammonia water to maintain a pH value and an ammonium ion concentration of an aqueous solution for nuclear generation within the above ranges.

After completion of nuclear generation, an acid such as sulfuric acid is added to adjust the pH value so as to be 10 or more and 12 or less based on the liquid temperature of 25° C. and smaller than the pH value in the nuclear generation process, thereby forming an aqueous solution for particle growth. After verifying that the pH value has reached a predetermined value, the raw material aqueous solution is supplied to grow the nuclei (particles) generated in the nuclear generation process. Note that, when an aqueous solution containing a compound of the additive element M is separately prepared, the aqueous solution containing the compound of the additive element M can be added only in the particle growth process or only in a specific stage (for example, the third stage and the fourth stage) of the particle growth process.

As the first stage of particle growth, crystallization in a non-oxidizing atmosphere having an oxygen concentration of 2% by volume or less is continued for a certain period of time from start of the particle growth process while stirring is performed using a stirrer.

As the second stage, switching operation 1 is performed in which air or oxygen is circulated in the reaction tank using an air diffuser tube having a pore size of 100 pm or more and 1 cm or less while supply of the raw material aqueous solution is continued, and the reaction atmosphere is adjusted to an oxidizing atmosphere having an oxygen concentration of 21% by volume or more. After the switching operation 1 is started, crystallization is performed while the oxidizing atmosphere is maintained and stirring is performed using a stirrer for a certain period of time.

As the third stage, switching operation 2 is performed in which gas in a non-oxidizing atmosphere is circulated in the reaction tank using the air diffuser tube while supply of the raw material aqueous solution is continued, and the reaction atmosphere is adjusted to a non-oxidizing atmosphere having an oxygen concentration of 2% by volume or less. After the switching operation 2 is started, crystallization is performed while the non-oxidizing atmosphere is maintained and stirring is performed using a stirrer for a certain period of time.

As the fourth stage, switching operation 3 is performed in which gas in an oxidizing atmosphere is circulated in the reaction tank using the air diffuser tube while supply of the raw material aqueous solution is continued, and the reaction atmosphere is adjusted to an oxidizing atmosphere having an oxygen concentration of 21% by volume or more. After the switching operation 3 is started, crystallization is performed while the oxidizing atmosphere is maintained and stirring is performed using a stirrer for a certain period of time.

As the fifth stage, switching operation 4 is performed in which gas in a non-oxidizing atmosphere is circulated in the reaction tank using the air diffuser tube while supply of the raw material aqueous solution is continued, and the reaction atmosphere is adjusted to a non-oxidizing atmosphere having an oxygen concentration of 2% by volume or less. After the switching operation 4 is started, crystallization is performed while the non-oxidizing atmosphere is maintained and stirring is performed using a stirrer for a certain period of time.

Time of each stage in the particle growth process satisfies second stage≤fourth stage<first stage≤third stage≤fifth stage. Crystallization time of the entire particle growth process is desirably eight hours or shorter.

The particle growth process can include the sixth stage in an oxidizing atmosphere and the seventh stage in a non-oxidizing atmosphere by similarly performing switching operations 5 and 6, respectively. Furthermore, the particle growth process can include the eighth stage in an oxidizing atmosphere and the ninth stage in a non-oxidizing atmosphere by performing switching operations 7 and 8, respectively. Furthermore, in addition, the particle growth process can include the tenth stage in an oxidizing atmosphere and the eleventh stage in a non-oxidizing atmosphere by performing switching operations 9 and 10, respectively.

Also in these cases, time of each stage in the particle growth process satisfies second stage≤fourth stage≤sixth stage≤eighth stage≤tenth stage≤first stage≤third stage≤fifth stage≤seventh stage≤ninth stage≤eleventh stage.

After completion of the crystallization, the obtained product is washed with water, filtered, and dried to obtain predetermined nickel-cobalt-manganese-containing composite hydroxide particles.

In the particle growth process, it is desirable to appropriately supply a sodium hydroxide aqueous solution, a sodium carbonate aqueous solution, and ammonia water through the process to maintain a pH value and an ammonium ion concentration of the aqueous solution for particle growth within the above ranges.

The composite hydroxide particles obtained by such a crystallization process have a particle structure in which a low density layer and a high density layer are laminated on each other around a high-density center section. By using the composite hydroxide particles having such a particle structure as a precursor, composite oxide particles having a particle structure having an aggregated section, one or more communication holes communicating with an outer periphery section of the aggregated section, and two or more space sections present inside the aggregated section and communicating with the communication holes can be easily obtained.

(2) Mixing Process

A mixing process is a process of mixing a lithium compound with the composite hydroxide particles described above or heat-treated particles obtained by heat-treating the composite hydroxide particles to obtain a lithium mixture.

In the mixing process, the composite hydroxide particles are mixed with the lithium compound such that a ratio (Li/Me) of the number of atoms of Li (Li) to the sum of the number of atoms (Me) of metal atoms other than Li in the lithium mixture, specifically, Ni, Mn, Co, and the additive element M is 0.95 or more and 1.5 or less, preferably 1.0 or more and 1.5 or less, more preferably 1.0 or more and 1.35 or less, and still more preferably 1.0 or more and 1.2 or less. That is, since Li/Me does not change after the firing process as compared with Li/Me before the firing process, it is necessary to mix the composite hydroxide with the lithium compound such that Li/Me in the mixing process is Li/Me of a target positive electrode active material.

The lithium compound used in the mixing process is not particularly limited, but lithium hydroxide, lithium nitrate, lithium carbonate, or a mixture of these is preferably used from a viewpoint of easy availability. Particularly, lithium hydroxide or lithium carbonate is preferably used in consideration of ease of handling and stability of quality.

A general mixer can be used for mixing. For example, a shaker mixer, a Lodige mixer, a Julia mixer, or a V blender can be used.

(3) Calcination Process

When lithium hydroxide or lithium carbonate is used as the lithium compound, it is also possible to perform a calcination process of calcining the lithium mixture at a temperature lower than a firing temperature described below, and at a temperature of 350° C. or higher and 800° C. or lower, and preferably 450° C. or higher and 750° C. or lower after the mixing process and before the firing process. As a result, it is possible to sufficiently diffuse Li into the composite hydroxide particles, and more uniform composite oxide particles can be obtained.

Note that holding time at the above temperature is preferably one hour or longer and ten hours or shorter, and more preferably three hours or longer and six hours or shorter.

Furthermore, the atmosphere in the calcination process is preferably an oxidizing atmosphere, and more preferably an atmosphere having an oxygen concentration of 18% by volume or more and 100% by volume or less as in the firing process described later.

(4) Firing Process

A firing process is a process of firing the lithium mixture obtained in the mixing process under a predetermined condition, and diffusing Li in the composite hydroxide to cause a reaction, thereby obtaining composite oxide particles.

A furnace used in the firing process is not particularly limited as long as the furnace can heat the lithium mixture in the air or an oxygen flow. However, an electric furnace that does not generate gas is preferable from a viewpoint of keeping the atmosphere in the furnace uniform, and either a batch type electric furnace or a continuous type electric furnace can be preferably used. This is also the same for the furnace used in the heat treatment process and the calcination process.

a) Firing Temperature

A firing temperature of the lithium mixture is set to 720° C. or higher and 980° C. or lower. When the firing temperature is lower than 720° C., the composite hydroxide particles and Li do not sufficiently react with each other, and excessive Li or unreacted composite hydroxide may remain, or the crystallinity of a positive electrode active material to be obtained may be insufficient. On the other hand, when the firing temperature exceeds 980° C., there is a possibility that the communication holes and space sections in the composite oxide particles are crushed to reduce the BET specific surface area of a positive electrode active material to be finally obtained, to reduce the oil absorption amount thereof, and to increase in the tap density thereof. Furthermore, sintering between particles of the positive electrode active material severely occurs, abnormal grain growth is caused, and the ratio of coarse particles having an irregular shape increases.

By controlling the firing temperature, it is possible to control the BET specific surface area of the positive electrode active material (secondary particles), the oil absorption amount thereof, the tap density thereof, the volume of the linking section per primary particle thereof, and the 50% cumulative diameter d50 thereof determined from the particle size distribution measured value. The firing temperature of the lithium mixture is set to preferably 730° C. or higher and 970° C. or lower and more preferably 750° C. or higher and 970° C. or lower from a viewpoint of controlling the BET specific surface area of the positive electrode active material (secondary particles), the oil absorption amount thereof, the tap density thereof, the volume of the linking section per primary particle thereof, and the 50% cumulative diameter d50 thereof determined from the particle size distribution measured value.

A temperature rising rate in the firing process is set to preferably 1° C./min or more and 10° C./min or less and more preferably 3° C./min or more 8° C./min or less. Furthermore, during the firing process, at a temperature near the melting point of the lithium compound, it is more preferable to lower the temperature rising rate to set the temperature rising rate to 0.3° C./min or more and 6° C./min or less. As a result, a reaction between the composite hydroxide particles and the lithium compound can be caused more uniformly.

b) Firing Time

Of the firing time, time during which the temperature is maintained at the above-described firing temperature is set to preferably at least two hours and more preferably three hours or longer and 20 hours or shorter. When the time during which the temperature is maintained at the firing temperature is shorter than two hours, Li is not sufficiently diffused into the composite oxide particles, and excessive Li or unreacted composite oxide particles may remain, or the crystallinity of a positive electrode active material to be obtained may be insufficient.

c) Firing Atmosphere

An atmosphere when firing is preferably an oxidizing atmosphere, more preferably an atmosphere having an oxygen concentration of 18% by volume or more and 100% by volume or less, and still more preferably an atmosphere having an oxygen concentration of 50% by volume or more and 100% by volume or less. The atmosphere when firing is particularly preferably a mixed atmosphere of oxygen having the above oxygen concentration and an inert gas. That is, firing is preferably performed in the air or an oxygen flow. When the oxygen concentration is less than 18% by volume, the crystallinity of the positive electrode active material may be insufficient.

(5) Crushing Process

The secondary particles obtained by the firing process and to constitute a positive electrode active material may be aggregated or slightly sintered. In such a case, the aggregate or sintered body is preferably crushed. This makes it possible to adjust the average particle size and the particle size distribution of a positive electrode active material to be obtained within a preferable range. Note that crushing means an operation of applying mechanical energy to an aggregate formed of a plurality of secondary particles generated by, for example, sintering necking between the particles when firing to separate the secondary particles from each other while hardly destroying the secondary particles themselves, thus loosening the aggregate.

A known means can be used for crushing, and for example, a pin mill or a hammer mill can be used. Note that at this time, a crushing force is preferably controlled within an appropriate range so as not to destroy the secondary particles themselves.

As described above, by adjusting the firing conditions, the BET specific surface area of the positive electrode active material (secondary particles), the oil absorption amount thereof, the tap density thereof, the volume of the linking section per primary particle thereof, and the 50% cumulative diameter d50 thereof determined from the particle size distribution measured value can be controlled, and finally, the positive electrode active material of the above embodiment having predetermined particle properties can be easily obtained.

3. Lithium Ion Secondary Battery

A lithium ion secondary battery of an embodiment of the present invention can adopt a similar configuration to that of a general non-aqueous electrolyte secondary battery including constituent members such as a positive electrode, a negative electrode, a separator, and a non-aqueous electrolyte. Alternatively, the lithium ion secondary battery of the present embodiment can adopt a similar configuration to that of a general solid electrolyte secondary battery including constituent members such as a positive electrode, a negative electrode, and a solid electrolyte. That is, the present invention can be widely applied to a secondary battery including a non-aqueous electrolyte solution secondary battery and an all-solid-state lithium ion secondary battery as long as the secondary battery is charged and discharged by de-inserting and inserting lithium ions. Note that embodiments described below are merely examples, and the present invention can be applied to lithium ion secondary batteries that are modified or improved in various ways based on the embodiments described in the present specification.

(1) Constituent Members a) Positive Electrode

Using the positive electrode active material of the above embodiment, for example, a positive electrode of a lithium ion secondary battery is prepared as follows.

First, a conductive material and a binding agent are mixed with the positive electrode active material of the above embodiment. Furthermore, activated carbon and a solvent, for example, for adjusting viscosity are added thereto as necessary. These are kneaded to prepare a positive electrode mixture paste. At this time, a mixing ratio among the components in the positive electrode mixture paste is also an important factor for determining performance of the lithium ion secondary battery. For example, when the solid content of the positive electrode mixture excluding the solvent is 100 parts by mass, the content of the positive electrode active material can be 60 parts by mass or more and 95 parts by mass or less, the content of the conductive material can be 1 part by mass or more and 20 parts by mass or less, and the content of the binding agent can be 1 part by mass or more and 20 parts by mass or less as in a positive electrode of a general lithium ion secondary battery.

The obtained positive electrode mixture paste is applied to a surface of a collector, for example, made of aluminum foil and dried to scatter the solvent. Pressurization may be performed by a roll press or the like in order to increase the electrode density as necessary. In this way, a sheet-shaped positive electrode can be prepared. The sheet-shaped positive electrode is cut into an appropriate size according to a target battery, for example, and used for preparing a battery. Note that, the method for preparing a positive electrode is not limited to the exemplified one, and other methods may be used.

Examples of the conductive material include graphite (natural graphite, artificial graphite, expanded graphite, and the like) and a carbon black-based material such as acetylene black or Ketjen black.

The binding agent serves to hold the active material particles together, and examples thereof include polyvinylidene fluoride (PVDF), polytetrafluoroethylene (PTFE), a fluorocarbon rubber, an ethylene propylene diene rubber, styrene butadiene, a cellulose-based resin, and polyacrylic acid.

In addition, a solvent that disperses the positive electrode active material, the conductive material, and the activated carbon and dissolves the binding agent can be added to the positive electrode mixture as necessary. Specifically, as the solvent, an organic solvent such as N-methyl-2-pyrrolidone can be used. Activated carbon can be added to the positive electrode mixture in order to increase electric double layer capacity.

b) Negative Electrode

Metallic lithium, a lithium alloy, or the like can be used for the negative electrode. Furthermore, a product formed by mixing a binding agent with a negative electrode active material capable of inserting and de-inserting lithium ions, adding an appropriate solvent thereto to form a paste-like negative electrode mixture, applying the negative electrode mixture to a surface of a collector made of metal foil such as copper, drying the negative electrode mixture, and compressing the resulting product to increase the electrode density as necessary can be used.

Examples of the negative electrode active material include a lithium-containing substance such as metallic lithium or a lithium alloy; natural graphite, artificial graphite, a fired organic compound such as or a phenolic resin, and a powdery carbon substance such as coke, which are capable of inserting and de-inserting lithium ions. In this case, as the negative electrode binding agent, similarly to the positive electrode, a fluorine-containing resin such as PVDF can be used, and as the solvent that disperses the negative electrode active material and the binding agent, an organic solvent such as N-methyl-2-pyrrolidone can be used.

c) Separator

The separator is sandwiched between the positive electrode and the negative electrode in the lithium ion secondary battery, and has a function of separating the positive electrode from the negative electrode and holding the electrolyte. As such a separator, for example, a polyethylene or polypropylene thin film having a large number of fine pores can be used. However, the separator is not particularly limited as long as having the above-described function. Furthermore, a solid electrolyte can also be used.

d) Electrolyte

As the non-aqueous electrolyte used in the non-aqueous electrolyte secondary battery, a non-aqueous electrolyte solution obtained by dissolving a lithium salt as a supporting salt in an organic solvent, or the like is used.

As the organic solvent used in the non-aqueous electrolyte solution, one selected from the group consisting of a cyclic carbonate such as ethylene carbonate, propylene carbonate, butylene carbonate, or trifluoropropylene carbonate, a chain carbonate such as diethyl carbonate, dimethyl carbonate, ethylmethyl carbonate, or dipropyl carbonate, an ether compound such as tetrahydrofuran, 2-methyltetrahydrofuran, or dimethoxy ethane, a sulfur compound such as ethylmethylsulfone or butanesulton, and a phosphorus compound such as triethyl phosphate or trioctyl phosphate can be used singly, or two or more selected therefrom can be used in mixture.

Examples of the supporting salt include $LiPF_6$, $LiBF_4$, $LiClO_4$, $LiAsF_6$, $LiN(CF_3SO_2)_2$, and a composite salt thereof.

Note that the non-aqueous electrolyte solution may contain a radical scavenger, a surfactant, a flame retardant, and the like.

A solid electrolyte used in a solid electrolyte secondary battery such as an all-solid-state lithium ion secondary battery has a property of withstanding a high voltage. As the solid electrolyte, there are an inorganic solid electrolyte and an organic solid electrolyte.

Examples of an oxide-based electrolyte include an oxide containing oxygen (O) and having lithium ion conductivity and electronic insulation properties, such as $Li_{1.3}Al_{0.3}Ti_{1.7}(PO_4)_3$, $Li_3PO_4$, $Li_3PO_4N_X$, $LiBO_2N_X$, $LiNbO_3$, $LiTaO_3$, $Li_2SiO_3$, $Li_4SiO_4$—$Li_3PO_4$, $Li_4SiO_4$—$Li_3VO_4$, $Li_2O$—$B_2O_3$—$P_2O_5$, $Li_2O$—$SiO_2$, $Li_2O$—$B_2O_3$—$ZnO$, $Li_{1+X}Al_XTi_{2-X}(PO_4)_3$ ($0 \leq X \leq 1$), $Li_{1+X}Al_XGe_{2-X}$ ($PO_4)_3$ ($0 \leq X \leq 1$), $LiTi_2$ ($PO_4)_3$, $Li_{3X}La_{2/3-X}TiO_3$ ($0 \leq X \leq \frac{2}{3}$), $Li_5La_3Ta_2O_{12}$, $Li_7La_3Zr_2O_{12}$, $Li_6BaLa_2Ta_2O_{12}$, or $Li_{3.6}Si_{0.6}P_{0.4}O_4$.

Examples of a sulfide solid electrolyte include a sulfide containing sulfur (S) and having lithium ion conductivity and electronic insulation properties, such as $Li_2S$—$SiS_2$, $Li_2S$—$P_2S_5$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, or $LiI$—$Li_3PO_4$—$P_2S_5$.

Examples of the inorganic solid electrolyte other than the oxide-based electrolyte and the sulfide solid electrolyte include $Li_3N$, $LiI$, and $Li_3N$—$LiI$—$LiOH$.

As the organic solid electrolyte, a high-molecular-weight compound exhibiting ionic conductivity can be used. For example, polyethylene oxide, polypropylene oxide, copolymers thereof, or the like can be used. Furthermore, the organic solid electrolyte can contain a supporting salt (lithium salt).

Note that, when the solid electrolyte is used, in order to secure contact between the electrolyte and the positive electrode active material, a solid electrolyte can be mixed also in the positive electrode material.

(2) Configuration of Lithium Ion Secondary Battery

The configuration of the lithium ion secondary battery is not particularly limited. A configuration including a positive electrode, a negative electrode, a separator, a non-aqueous electrolyte, and the like in a non-aqueous electrolyte secondary battery or a configuration including a positive electrode, a negative electrode, a solid electrolyte, and the like in a solid electrolyte secondary battery may be adopted. Furthermore, the shape of the secondary battery is not particularly limited, and various shapes such as a cylindrical shape or a layered shape can be adopted.

In the case of a non-aqueous electrolyte secondary battery, for example, the positive electrode and the negative electrode are laminated via the separator to form an electrode body, the obtained electrode body is impregnated with a non-aqueous electrolyte, a positive electrode collector is connected to a positive electrode terminal leading to the outside using a current collecting lead or the like, a negative electrode collector is connected to a negative electrode terminal leading to the outside using a current collecting lead or the like, and the resulting product is sealed in a battery case to complete a lithium ion secondary battery.

(3) Characteristics of Lithium Ion Secondary Battery

As described above, the lithium ion secondary battery of the present embodiment includes secondary particles having a hollow structure or a multilayer structure having a space section excellent in output characteristics, and uses the positive electrode active material of the above embodiment as a positive electrode material, output characteristics and mechanical strength of the positive electrode active material being further improved. Therefore, the lithium ion secondary battery of the present embodiment is excellent in output characteristics and durability characteristics.

(4) Application of Lithium Ion Secondary Battery

As described above, the lithium ion secondary battery of the present embodiment is excellent in output characteristics and durability characteristics, and can be preferably used for a power supply of an electric tool or an environmental automobile which is required to have these characteristics at a high level.

EXAMPLES

Hereinafter, an embodiment of the present invention will be described in detail with reference to Examples and Comparative Examples. Through a nuclear generation process and a particle growth process, a pH value of a reaction aqueous solution was measured by a pH controller, and by adjusting the supply amounts of a sodium hydroxide aqueous solution and a sodium carbonate aqueous solution based on the measured value, a fluctuation range of the pH value of the reaction aqueous solution in each of the processes was controlled to be within a range of ±0.2.

Example 1 a) Manufacture of Composite Hydroxide
[Nuclear Generation Process]

First, 17 L of water was put in a reaction tank, and the temperature in the tank was set to 40° C. while water was stirred. At this time, a nitrogen gas was circulated in the reaction tank for one hour to set the reaction atmosphere to a non-oxidizing atmosphere having an oxygen concentration of 2% by volume or less. Subsequently, a 25% by mass sodium hydroxide aqueous solution, a 25% by mass sodium carbonate aqueous solution, and 25% by mass ammonia water were supplied into the reaction tank in appropriate amounts, and adjustment was performed such that a pH value was 12.6 based on the liquid temperature of 25° C. and an ammonium ion concentration was 10 g/L, thereby forming a pre-reaction aqueous solution.

At the same time, nickel sulfate, manganese sulfate, and cobalt sulfate were dissolved in water such that a molar ratio among the metal elements satisfied Ni : Co : Mn=5 : 2 : 3 to prepare a 2 mol/L raw material aqueous solution.

W was used as the additive element M. Sodium tungstate dihydrate was dissolved in water such that a molar ratio among the metal elements including the additive element M in composite hydroxide particles to be obtained was Ni : Mn : Co : W=5.0 : 2.0 : 3.0 : 0.1, thereby preparing a sodium tungstate aqueous solution.

Next, the raw material aqueous solution was supplied to the pre-reaction aqueous solution at 115 ml/min to form an aqueous solution for nuclear generation process, and nuclear generation was performed for one minute. At this time, a 25% by mass sodium hydroxide aqueous solution, a 25% by mass sodium carbonate aqueous solution, and 25% by mass ammonia water were appropriately supplied to maintain the pH value and the ammonium ion concentration of the aqueous solution for nuclear generation within the above ranges.

[Particle Growth Process]

After completion of nuclear generation, supply of all the aqueous solutions was stopped temporarily, and sulfuric acid was added to adjust the pH value to 11.0 based on the liquid temperature of 25° C., thereby forming an aqueous solution for particle growth. After verifying that the pH value had reached a predetermined value, the raw material aqueous solution was supplied at a similar constant rate of 100 ml/min to that in the nuclear generation process to grow the nuclei (particles) generated in the nuclear generation process. Note that the sodium tungstate aqueous solution was supplied at a constant rate of 10 ml/min simultaneously with the raw material aqueous solution in the third stage and the fourth stage.

As the first stage, crystallization in a non-oxidizing atmosphere having an oxygen concentration of 2% by volume or less was continued for 35 minutes from start of the particle growth process while stirring was performed using a stirrer.

As the second stage, air was circulated in the reaction tank using a SUS air diffuser tube having a pore size of 1.0 mm while supply of the raw material aqueous solution was continued, and the reaction atmosphere was adjusted to an oxidizing atmosphere having an oxygen concentration of 21% by volume (switching operation 1). After start of the switching operation 1, crystallization was performed for 20 minutes while stirring was performed using a stirrer.

As the third stage, nitrogen was circulated in the reaction tank using the air diffuser tube while supply of the raw material aqueous solution was continued and a sodium tungstate aqueous solution was supplied, and the reaction atmosphere was adjusted to a non-oxidizing atmosphere having an oxygen concentration of 2% by volume or less (switching operation 2). After start of the switching operation 2, crystallization was performed for 65 minutes while stirring was performed using a stirrer.

As the fourth stage, air was circulated in the reaction tank using the air diffuser tube while supply of the raw material aqueous solution and the sodium tungstate aqueous solution was continued, and the reaction atmosphere was adjusted to an oxidizing atmosphere having an oxygen concentration of 21% by volume was performed (switching operation 3). After start of the switching operation 3, crystallization was performed for 40 minutes while stirring was performed using a stirrer.

As the fifth stage, nitrogen was circulated in the reaction tank using the air diffuser tube while supply of the sodium tungstate aqueous solution was stopped and supply of the raw material aqueous solution was continued, and the reaction atmosphere was adjusted to a non-oxidizing atmosphere having an oxygen concentration of 2% by volume or less (switching operation 4). After start of the switching operation 4, crystallization was performed for 110 minutes while stirring was performed using a stirrer.

Thereafter, supply of all the aqueous solutions including the raw material aqueous solution was stopped to complete the particle growth process. The obtained product was washed with water, filtered, and dried to obtain composite hydroxide particles.

In the particle growth process, a 25% by mass sodium hydroxide aqueous solution, a 25% by mass sodium carbonate aqueous solution, and 25% by mass ammonia water were appropriately supplied through the process to maintain the pH value and the ammonium ion concentration of the aqueous solution for particle growth within the above ranges.

b) Preparation of Positive Electrode Active Material

The obtained composite hydroxide was sufficiently mixed with lithium hydroxide using a shaker mixer such that Li/Me was 1.10 to obtain a lithium mixture (mixing process).

The temperature of this lithium mixture was raised to 970° C. in an oxygen (oxygen concentration: 100% by volume) atmosphere at a temperature rising rate of 1.3° C./min. The lithium mixture was held at this temperature for three hours to be fired, and then cooled to room temperature (firing process).

In order to eliminate aggregation or slight sintering of the obtained lithium transition metal-containing composite oxide particles, this positive electrode active material was crushed (crushing process).

c) Evaluation of Positive Electrode Active Material

[Composition]

The composition of the positive electrode active material was analyzed by analysis using an ICP emission spectrometer (ICPE-9000 manufactured by Shimadzu Corporation).

[Particle Size Distribution]

Using a laser light diffraction scattering particle size analyzer (Microtrac MT 3300 EXII manufactured by Microtrac Bell Co., Ltd.), the 50% cumulative diameter d50, the 10% cumulative diameter d10, and the 90% cumulative diameter d90 of the positive electrode active material (secondary particles) determined from the particle size distribution measured value were obtained.

[BET Specific Surface Area and Tap Density]

The BET specific surface area of the secondary particles was measured using a flow method gas adsorption type specific surface area measuring apparatus (Macsorb 1200 series manufactured by Mountech Co., Ltd.), and the tap density of the secondary particles was measured using a tapping machine (KRS-406 manufactured by Kuramochi Scientific Instruments Co., Ltd.).

[Oil Absorption Amount]

The oil (di-n-butyl phthalate (DBP)) absorption amount of the positive electrode active material (secondary particles) was measured using an oil absorption amount measuring apparatus (S-500 manufactured by Asahi Soken Co., Ltd) in accordance with "JIS K 6217-4: 2008".

[Particle Structure]

A part of the positive electrode active material was embedded in a resin, processing using a cross section polisher (IB-19530CP manufactured by JEOL Ltd.) was performed such that a cross section thereof could be observed, and then the cross section was observed by an SEM (FE-SEM: JSM-6360LA manufactured by JEOL Ltd.). As illustrated in FIG. 1, it was confirmed that the positive electrode active material of the present Example included secondary particles each formed of an aggregation of a plurality of primary particles, about six communication holes exist in an outer periphery section of each of the secondary particles, and about eight space sections exist inside each of the secondary particles, and that the communication holes in the outer periphery section and the internal space sections were connected to each other.

[Coefficient of Variation]

Figure 2:
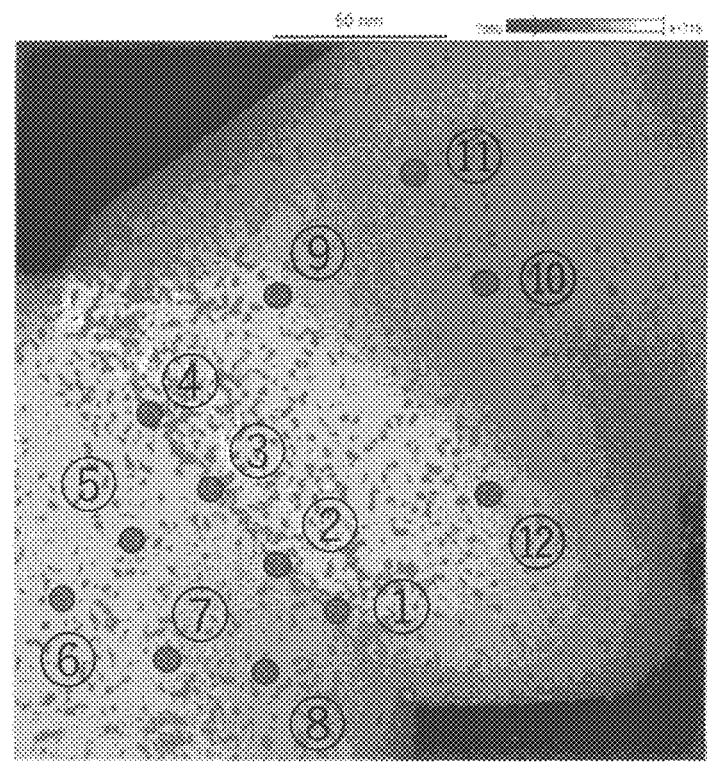
FIG. 2 is cross-sectional data illustrating a measurement result of the concentration of W by TEM-EDX analysis for primary particles of the positive electrode active material for a lithium ion secondary battery of Example 1.

A cross section of the positive electrode active material (secondary particles) was sectioned using an ion milling apparatus (Cryoion slicer IB-09060CIS manufactured by JEOL Ltd.). As illustrated in FIG. 2, using a TEM (JEM-ARM200F manufactured by JEOL Ltd.), primary particles having a particle size of about 0.5 μm (two particles linked with each other with a grain boundary interposed therebetween) in the cross section of the secondary particles were targeted, and a total of 12 locations arbitrarily selected from the entire primary particles including insides of the primary particles and grain boundaries of the primary particles were irradiated with an electron beam. Energy of a generated characteristic X-ray of W was analyzed using EDX (NSS manufactured by Thermo Fisher Scientific), and an average concentration (μ) of W, a standard deviation (σ) of the concentration of W, and a coefficient of variation (CV) of the concentration of W in the entire primary particles were analyzed. The measurement results of the concentration of W for the obtained primary particles by TEM-EDX analysis are presented in Table 1.

As a result, the average concentration (μ) of W was 1.0, the standard deviation (σ) of the concentration of W was 1.1, and the coefficient of variation (CV) of the concentration of W was 1.1.

TABLE 1

|  |  | Additive element (W) |
| --- | --- | --- |
| 1 | Grain boundary | 3.4 |
| 2 | Grain boundary | 2.0 |
| 3 | Grain boundary | 1.7 |
| 4 | Grain boundary | 1.2 |
| 5 | Inside of particle | 2.4 |
| 6 | Inside of particle | 0.1 |
| 7 | Inside of particle | 0.1 |
| 8 | Inside of particle | 0.1 |
| 9 | Inside of particle | 0.7 |
| 10 | Inside of particle | 0.1 |
| 11 | Inside of particle | 0.5 |
| 12 | Inside of particle | 0.2 |
| Average | M | 1.0 |
| Standard deviation | Σ | 1.1 |
| Coefficient of variation | CV | 1.1 |

[Volume of Linking Section Per Primary Particle]

A part of the positive electrode active material was embedded in a thermosetting resin, and then three-dimensional SEM observation was performed under the following conditions.

<Apparatus Used>

Dual Beam SEM-FIB apparatus: Scios manufactured by FEI Company Japan Ltd.

<SEM Observation Conditions>

Acceleration voltage: 2 kV

Current value: 0.1 nA

Operation distance: 7 mm

Magnification: 10 k (HFW: 20.7 μm)

Number of pixels: X: 1536×Y: 1024 (pixel size: X: 4.56 nm×Y: 4.56 nm)

Tilt Angle: 52°

Dwell Time: 30 μs (1 Scan)

Detector: Reflected electron detector

<FIB processing Conditions>

Acceleration voltage: 30 kV

Current value: 100 pA

Operation distance: 19 mm

Processing pitch: 30 nm

Y-axis inclination angle correction, XY alignment, trimming of an unnecessary region, and upper and lower luminance adjustment were performed on the obtained set of two-dimensional images using image analysis software "AVIZO" (manufactured by FEI Company Japan Ltd.), and then a three-dimensional observation image was obtained. The voxel size of the obtained three-dimensional observation image was X: 13.49 nm, Y: 17.12 nm, and Z: 30 nm.

A binarized image was obtained from the obtained three-dimensional observation image by the following processes, and the obtained binarized image was subjected to the following analysis to determine the volume of the linking section per primary particle.

<Size Equalization Process>

The pixels were recalculated such that the X-axis pixel size, the Y-axis pixel size, and the Z-axis pixel size were equivalent, and the voxel size after recalculation was X: 13.49 nm, Y: 13.49 nm, and Z: 13.49 nm.

<Binarization Process>

The three-dimensional observation image was binarized using a luminance difference between a region constituting the secondary particles and the other region (a resin region used for embedding) to obtain a binarized image. The binarized image was smoothed by morphology processing using the above image analysis software.

<Watershed Algorithm>

The binarized image of the secondary particles was processed using a watershed algorithm by the above image analysis software to separate the linking section between the primary particles, thereby obtaining a binarized image obtained by extracting the primary particles (binarized image after primary particle separation). Furthermore, a binarized image of the linking section between the primary particles was obtained from the binarized image before the separation of the primary particles and the binarized image after the separation of the primary particles. For these binarized images, a three-dimensional image was constructed from a two-dimensional image corresponding to a depth direction in the Z-axis direction.

Thereafter, by labeling processing using the above image analysis software, the primary particles were made distinguishable from the binarized image after the primary particle separation by numbering, and the number of the primary particles was measured.

The total volume of the linking section between the primary particles was divided by the obtained number of the primary particles to obtain a value of the volume of the linking section per primary particle. As a result, the volume of the linking section per primary particle was $6.2×10^5$ nm$^3$.

d) Preparation of Secondary Battery

Figure 5:
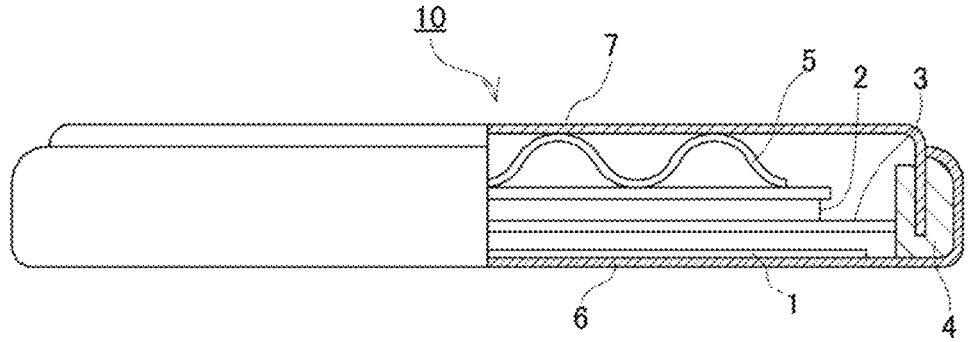
FIG. 5 is a schematic cross sectional view of a 2032 type coin-type battery used for battery evaluation.

A 2032 type coin-type battery 10 as illustrated in FIG. 5 was prepared. Specifically, 52.5 mg of the positive electrode active material obtained as described above, 15 mg of acetylene black, and 7.5 mg of PTFE were mixed and press-molded to a diameter of 11 mm and a thickness of 100 μm at a pressure of 100 MPa, thereby preparing a positive electrode 1.

Next, using this positive electrode 1, a 2032 type coin-type battery was prepared in a glove box having an Ar atmosphere with a dew point controlled at −60° C. For a negative electrode 2 of the 2032 type coin-type battery, a lithium metal having a diameter of 14 mm and a thickness of 1 mm was used. For a non-aqueous electrolyte solution, an equivalent mixed solution of ethylene carbonate (EC) and diethyl carbonate (DEC) using 1 M LiClO$_4$ as a supporting electrolyte (manufactured by Ube Industries, Ltd.) was used. For a separator 3, a polyethylene porous film having a film thickness of 25 μm was used. In this way, the 2032 type coin-type battery 10 having a gasket 4 and a wave washer 5 and including a positive electrode can 6 and a negative electrode can 7 was assembled.

e) Battery Evaluation

[Positive Electrode Resistance]

Figure 6:
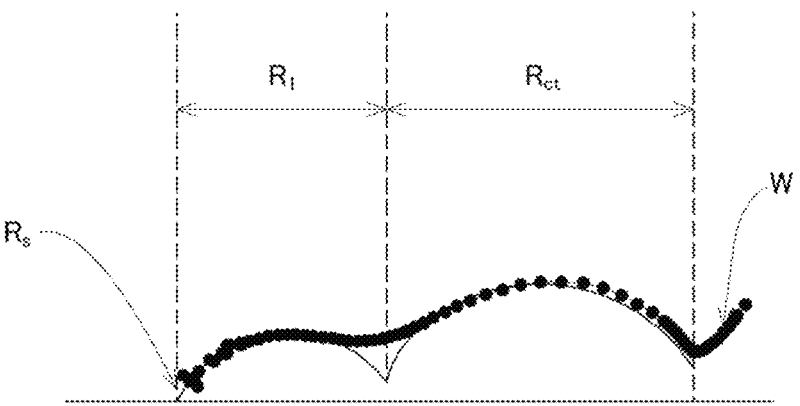
FIG. 6 is a graph illustrating a measurement example of impedance evaluation.
Figure 7:
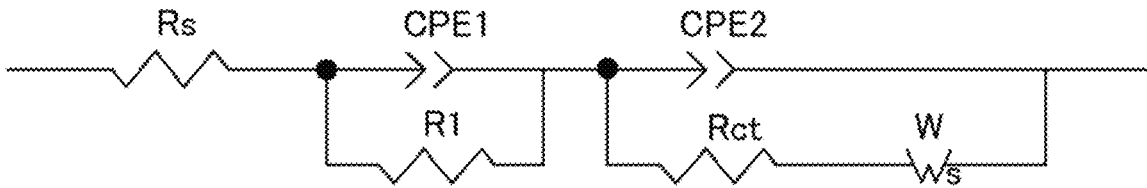
FIG. 7 is a schematic explanatory diagram of an equivalent circuit used for analysis.

In measurement of positive electrode resistance, a 2032 type coin-type battery was charged at 3.8 V using an impedance measuring method, and the positive electrode resistance was measured using a frequency response analyzer and a potentiogalvanostat (1255B manufactured by Solartron Analytical Inc.) by an AC impedance method to obtain an impedance spectrum illustrated in FIG. 6. In the obtained impedance spectrum, two semicircles were observed in a high frequency area and an intermediate frequency area, and a straight line was observed in a low frequency area. Therefore, an equivalent circuit illustrated in FIG. 7 was assembled, and positive electrode interface resistance was analyzed. Here, $R_s$ represents bulk resistance, $R_1$ represents positive electrode coating film resistance, $R_{ct}$ represents electrolyte solution/positive electrode interface resistance, W represents a Warburg component, and CPE1 and CPE2 represent constant phase elements. Note that the positive electrode interface resistance indicates a resistance decrease ratio with respect to positive electrode interface resistance of a positive electrode active material of Comparative Example 1 described below.

The overall composition and characteristics of the obtained positive electrode active material and the characteristics of the obtained lithium ion secondary battery are presented in Table 2. Note that these items of Examples 2 to 4 and Comparative Examples 1 and 2 are also presented in Table 2 similarly.

Example 2

A positive electrode active material was obtained and evaluated in a similar manner to Example 1 except that the lithium mixture was heated to 920° C. and held at this temperature for three hours for firing.

Example 3

A positive electrode active material was obtained and evaluated in a similar manner to Example 2 except that a sodium tungstate aqueous solution was prepared such that a molar ratio among the metal elements was Ni : Mn : Co : W=5.0 : 2.0 : 3.0 : 0.07.

Example 4

A positive electrode active material was obtained and evaluated in a similar manner to Example 1 except that crystallization was performed using an aqueous solution prepared by mixing a sodium tungstate aqueous solution with a raw material aqueous solution containing Ni, Mn, and Co such that Ni : Mn : Co : W=5.0 : 2.0 : 3.0 : 0.1.

Comparative Example 1

Figure 4:
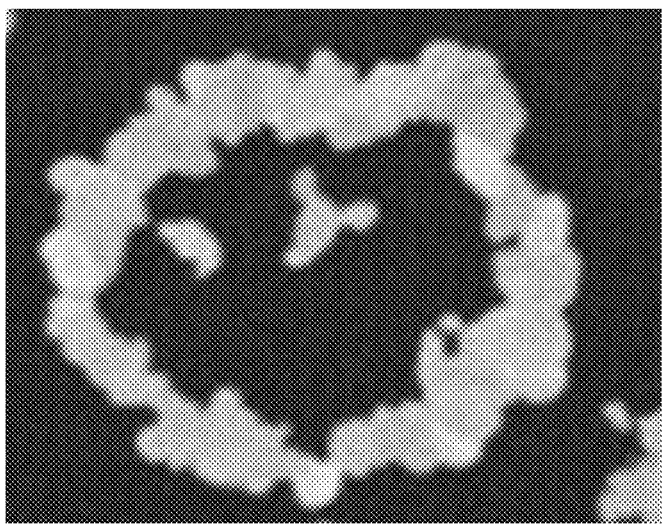
FIG. 4 is an SEM image of a cross section of secondary particles of a positive electrode active material for a lithium ion secondary battery of Comparative Example 1.

A positive electrode active material was obtained and evaluated in a similar manner to Example 1 except that in the crystallization process, crystallization was performed by adjusting the atmosphere to an oxidizing atmosphere having an oxygen concentration of 21% by volume entirely from the nuclear generation process up to the switching operation 1 in the particle growth process, and then by adjusting the atmosphere to a non-oxidizing atmosphere having an oxygen concentration of 2% by volume or less in the subsequent process, a composite hydroxide was obtained. FIG. 4 illustrates a particle structure of the obtained positive electrode active material. It was confirmed that the positive electrode active material of Comparative Example 1 was formed of a hollow structure including a secondary particle obtained by aggregating a plurality of primary particles, having one communication hole in an outer periphery section of the secondary particle, and having one space section in the secondary particle, the communication hole in the outer periphery section and the internal space section being connected to each other.

Comparative Example 2

A positive electrode active material was obtained and evaluated in a similar manner to Example 1 except that crystallization was performed using an aqueous solution prepared by mixing a sodium tungstate aqueous solution with a raw material aqueous solution containing Ni, Mn, and Co such that Ni : Mn : Co : W=5.0 : 2.0 : 3.0 : 0.12 and the firing temperature was 900° C.

TABLE 2

| | Composition | D50 (μm) | BET specific surface area (m²/g) | Tap density (g/cm³) | Oil absorption amount (ml/100 g) | W concentration coefficient of variation (CV) | Volume of linking section (nm³/piece) |
|---|---|---|---|---|---|---|---|
| Example 1 | $Li_{1.1}Ni_{0.496}Mn_{0.296}Co_{0.198}W_{0.010}O_2$ | 5.0 | 2.7 | 1.5 | 42 | 1.1 | $6.2 \times 10^5$ |
| Example 2 | $Li_{1.1}Ni_{0.496}Mn_{0.296}Co_{0.198}W_{0.010}O_2$ | 5.1 | 3.8 | 1.4 | 47 | 1.2 | $1.3 \times 10^6$ |
| Example 3 | $Li_{1.1}Ni_{0.497}Mn_{0.297}Co_{0.198}W_{0.007}O_2$ | 5.1 | 3.3 | 1.4 | 43 | 1.2 | $7.5 \times 10^6$ |
| Example 4 | $Li_{1.1}Ni_{0.496}Mn_{0.296}Co_{0.198}W_{0.010}O_2$ | 5.1 | 3.4 | 1.4 | 46 | 1.5 | $8.8 \times 10^7$ |
| Comparative Example 1 | $Li_{1.1}Ni_{0.496}Mn_{0.296}Co_{0.198}W_{0.010}O_2$ | 5.1 | 1.2 | 1.5 | 40 | 1.2 | $1.2 \times 10^5$ |
| Comparative Example 2 | $Li_{1.1}Ni_{0.496}Mn_{0.296}Co_{0.198}W_{0.010}O_2$ | 5.2 | 4.0 | 1.3 | 52 | 1.8 | $9.5 \times 10^7$ |

| | | | Particle structure | | Positive electrode |
|---|---|---|---|---|---|
| | (d90 − d10)/d50 | d90/d10 | Number of communication holes | Number of space sections | interface resistance (based on Comparative Example 1) |
| Example 1 | 0.44 | 1.4 | 6 | 8 | 0.85 |
| Example 2 | 0.45 | 1.5 | 14 | 25 | 0.75 |
| Example 3 | 0.45 | 1.5 | 10 | 20 | 0.85 |
| Example 4 | 0.46 | 1.4 | 9 | 18 | 0.95 |
| Comparative Example 1 | 0.44 | 1.4 | 1 | 1 | 1.0 |
| Comparative Example 2 | 0.48 | 1.6 | 16 | 30 | 1.1 |

In each of the positive electrode active materials of Examples 1 to 4 within the scope of the present invention, it was confirmed that positive electrode resistance was reduced and output characteristics were improved when each of the positive electrode active materials was used in a lithium ion secondary battery, as compared with those of Comparative Examples 1 and 2.

Reference Signs List

1 Positive electrode (electrode for evaluation)
2 Negative electrode
3 Separator
4 Gasket
5 Wave washer
6 Positive electrode can
7 Negative electrode can
10 Coin-type battery

The invention claimed is:

1. A positive electrode active material for a lithium ion secondary battery, the positive electrode active material comprising:

lithium transition metal-containing composite oxide particles having a composition represented by general formula (A): $Li_{1+u}Ni_xMn_yCo_zM_tO_2$, where $-0.05 \leq u \leq 0.5$, $x+y+z+t=1$, $0.3 \leq x \leq 0.9$, $0 \leq y \leq 0.5$, $0 \leq z \leq 0.5$, $0 < t \leq 0.05$, and M is one or more additive elements selected from Mg, Al, Si, Ca, Ti, V, Cr, Zr, Nb, Mo, Hf, Ta, and W, and a layered rock salt type crystal structure, the lithium transition metal-containing composite oxide particles composed of secondary particles each formed of an aggregation of primary particles, the secondary particles having a 50% cumulative diameter d50 of 3.0 μm or more and 7.0 um or less, the 50% cumulative diameter d50 being determined from a particle size distribution measured value, a BET specific surface area of 2.0 m²/g or more and 5.0 m²/g or less, a tap density of 1.0 g/cm³ or more and 2.0 g/cm³ or less, and an oil absorption amount of 30 ml/100 g or more and 60 ml/100 g or less, and for each of a plurality of primary particles having a primary particle size within a range of 0.1 μm or more and 1.0 μm or less among the primary particles, when a concentration of the additive element M is measured at a plurality of locations by cross-sectional STEM or TEM-EDX analysis, and a coefficient of variation, which is a value obtained by dividing a standard deviation of an average concentration of the concentration of the additive element M by the average concentration, is calculated, the coefficient of variation being 1.5 or less, wherein the secondary particle has an aggregated section which forms an outer periphery section and an internal section of the secondary particle, the aggregated section of the outer periphery section having one or more communication holes, the aggregated section of the internal section having two or more space sections communicating with the one or more communication holes of the outer periphery section, and wherein a volume of a linking section between the primary particles per primary particle, obtained from a total volume of the linking section in a binarized image obtained by binarizing a three-dimensional observation image of the secondary particles, the total volume being specified using a watershed algorithm from the binarized image, and the number of the primary particles in the binarized image, is $5 \times 10^5$ nm³ or more and $9 \times 10^7$ nm³ or less.

2. The positive electrode active material for a lithium ion secondary battery according to claim 1, wherein the volume of the linking section per the primary particle is $8 \times 10^5$ nm³ or more and $9 \times 10^6$ nm³ or less.

3. The positive electrode active material for a lithium ion secondary battery according to claim 1, wherein the 50% cumulative diameter d50 of the secondary particles is 4.0 μm or more and 6.0 μm or less.

4. The positive electrode active material for a lithium ion secondary battery according to claim 1, wherein [(d90−d10)/d50], where d10 is a 10% cumulative diameter determined from a particle size distribution measured value, and d90 is a 90% cumulative diameter determined from the particle size distribution measured value, which is an index indicating spread of a particle size distribution of the secondary particles, is 1.0 or less.

5. The positive electrode active material for a lithium ion secondary battery according to claim 1, wherein a value of d90/d10 of the secondary particles, where d10 is a 10% cumulative diameter determined from a particle size distribution measured value, and d90 is a 90% cumulative diameter determined from the particle size distribution measured value, is 1.0 or more and 2.0 or less.

6. The positive electrode active material for a lithium ion secondary battery according to claim 1, wherein the additive element M is at least one selected from the group consisting of Mg, Al, Si, Ti, Zr, Nb, Mo, and W.

7. The positive electrode active material for a lithium ion secondary battery according to claim 1, wherein the additive element M is W.

8. A lithium ion secondary battery comprising: a positive electrode; a negative electrode; a separator; and a non-aqueous electrolyte, or a positive electrode; a negative electrode; and a solid electrolyte, wherein the positive electrode active material for a lithium ion secondary battery according to claim 1 is used as a positive electrode active material used in the positive electrode.

9. A positive electrode active material for a lithium ion secondary battery, the positive electrode active material comprising:

lithium transition metal-containing composite oxide particles having a composition represented by general formula (A): $Li_{1+u}Ni_xMn_yCo_zMO_2$, where $-0.05 \leq u \leq 0.5$, $x+y+z+t=1$, $0.3 \leq x \leq 0.9$, $0 \leq y \leq 0.5$, $0 \leq z \leq 0.5$, $0 < t \leq 0.05$, and M is one or more additive elements selected from Mg, Al, Si, Ca, Ti, V, Cr, Zr, Nb, Mo, Hf, Ta, and W, and a layered rock salt type crystal structure, the lithium transition metal-containing composite oxide particles composed of secondary particles each formed of an aggregation of primary particles, the secondary particles having a 50% cumulative diameter d50 of 3.0 μm or more and 7.0 μm or less, the 50% cumulative diameter d50 being determined from a particle size distribution measured value, a BET specific surface area of 2.0 m²/g or more and 5.0 m²/g or less, a tap density of 1.0 g/cm³ or more and 2.0 g/cm³ or less, and an oil absorption amount of 30 ml/100 g or more and 60 ml/100 g or less, and for each of a plurality of primary particles having a primary particle size within a range of 0.1 μm or more and 1.0 μm or less among the primary particles, when a concentration of the additive element M is measured at a plurality of locations by cross-sectional STEM or TEM-EDX analysis, and a coefficient of variation, which is a value obtained by dividing a standard deviation of an average concentration of the concentration of the additive element M by the average concentration, is calculated, the coefficient of variation being 1.5 or less, wherein a volume of a linking section between the primary particles per primary particle, obtained from a total volume of the linking section in a binarized image obtained by binarizing a three-dimensional observation image of the secondary particles, the total volume being specified using a watershed algorithm from the binarized image, and the number of the primary particles in the binarized image, is $5 \times 10^5$ nm$^3$ or more and $9 \times 10^7$ nm$^3$ or less.

10. The positive electrode active material for a lithium ion secondary battery according to claim 9, wherein the volume of the linking section per the primary particle is $8 \times 10^5$ nm$^3$ or more and $9 \times 10^6$ nm$^3$ or less.

11. The positive electrode active material for a lithium ion secondary battery according to claim 9, wherein the secondary particle has an aggregated section which forms an outer periphery section and an internal section of the secondary particle, the aggregated section of the outer periphery section having one or more communication holes, the aggregated section of the internal section having two or more space sections communicating with the one or more communication holes of the outer periphery section.

\* \* \* \* \*